US007013322B2

(12) United States Patent
Lahr

(10) Patent No.: US 7,013,322 B2
(45) Date of Patent: Mar. 14, 2006

(54) SYSTEM AND METHOD FOR REWRITING A MEDIA RESOURCE REQUEST AND/OR RESPONSE BETWEEN ORIGIN SERVER AND CLIENT

(75) Inventor: Nils B. Lahr, Antioch Heights, CA (US)

(73) Assignee: WilTel Communications Group, LLC, Tulsa, OK (US)

( * ) Notice: Subject to any disclaimer, the term of this patent is extended or adjusted under 35 U.S.C. 154(b) by 718 days.

(21) Appl. No.: 09/770,645

(22) Filed: Jan. 29, 2001

(65) Prior Publication Data

US 2002/0040366 A1   Apr. 4, 2002

Related U.S. Application Data

(60) Provisional application No. 60/178,750, filed on Jan. 28, 2000.

(51) Int. Cl.
G06F 15/16   (2006.01)
(52) U.S. Cl. .................... 709/201; 709/217; 709/226; 709/238; 709/246
(58) Field of Classification Search ........ 709/201–203, 709/206, 217–219, 225–227, 230–232, 238, 709/246, 249; 707/4, 10; 710/65; 341/50, 341/51
See application file for complete search history.

(56) References Cited

U.S. PATENT DOCUMENTS 5,742,762 A * 4/1998 Scholl et al. ............... 709/200
5,819,020 A * 10/1998 Beeler, Jr. ...................... 714/5
5,862,325 A * 1/1999 Reed et al. .................. 709/201
5,951,694 A   9/1999 Choquier et al. ............. 714/15
6,003,076 A * 12/1999 Maruyama et al. ......... 709/223
6,003,084 A   12/1999 Green et al.
6,130,890 A   10/2000 Leinwand et al.
6,141,759 A * 10/2000 Braddy ....................... 713/201
6,185,598 B1   2/2001 Farber et al.
6,189,078 B1 * 2/2001 Bauman et al. ............. 711/156
6,275,470 B1   8/2001 Ricciulli
6,622,157 B1 * 9/2003 Heddaya et al. ............ 709/202
6,701,376 B1 * 3/2004 Haverstock et al. ........ 709/246

* cited by examiner

*Primary Examiner*—Frantz B. Jean
(74) *Attorney, Agent, or Firm*—Fellers, Snider, Blankenship, Bailey & Tippens, P.C.

(57) ABSTRACT

A distributed network which is capable of dynamically changing media resource request metafiles, as well as the responses to those media resource requests by media servers in the network, to provide more efficient content delivery in the network. The network employs a system and method for intercepting a media resource request metafile client request, or a response to the media resource request by a media server in the network, and intelligently rewriting the response before sending it back to the requesting client. The file or protocol response can be rewritten according to localized information such as resource availability and client request information which the centralized web server may not have or even be able to obtain, such as the client's ISP, browser type, ISP's surfing trends and so on. The system and method thus enables the network to send the local client to either a local server or a remote server to receive the requested content.

20 Claims, 15 Drawing Sheets

SYSTEM AND METHOD FOR REWRITING A MEDIA RESOURCE REQUEST AND/OR RESPONSE BETWEEN ORIGIN SERVER AND CLIENT

CROSS REFERENCE TO RELATED APPLICATIONS

This application claims benefit under 35 U.S.C. §119(e) of a U.S. provisional application of Nils B. Lahr entitled "Method of Rewriting Metafile Between Origin Server and Client", Ser. No. 60/178,750, filed Jan. 28, 2000, the entire contents of which is incorporated herein by reference.

Related subject matter is disclosed in co-pending U.S. patent application of Nils B. Lahr et al., filed Sep. 28, 1998, entitled "Streaming Media Transparency" Ser. No. 09/162,106; in co-poending U.S. patent application of Nils B. Lahr, filed even date herewith, entitled "Method and Apparatus for Encoder-Based Distribution of Live Video and Other Streaming Content" Ser. No. 09/770,633; in co-pending U.S. patent application of Nils B. Lahr, filed even date herewith, entitled "A System and Method for Determining Optimal Server in a Distributed Network for Serving Content Streams", Ser. No. 09/770,642; in co-pending U.S. patent application of Nils B. Lahr, filed even date herewith, entitled "Method and Apparatus for Client-Side Authentication and Stream Selection in a Content Distribution System" Ser. No. 09/770,632; in co-pending U.S. patent application of Nils B. Lahr, filed even date herewith, entitled "Method and System for Real-Time Distributed Data Mining and Analysis for Networks" Ser. No. 09/770,641; in co-pending U.S. patent application of Nils B. Lahr et al., filed even date herewith, entitled "Method and Apparatus for Mirroring and Caching of Compressed Data in a Content Distribution System" Ser. No. 09/770,681; in co-pending U.S. patent application of Nils B. Lahr, filed even date herewith, entitled "Method of Utilizing a Single Uniform Resource Locator for Resources with Multiple Formats", Ser. No. 09/770,682; and in co-pending U.S. patent application of Nils B. Lahr, filed even date herewith, entitled "A System and Method for Performing Broadcast-Enabled Disk Drive Replication in a Distributed Data Delivery Network" Ser. No. 09/770,680; the entire contents of each of these applications being expressly incorporated herein by reference.

BACKGROUND OF THE INVENTION

1. Field of the Invention

The present invention relates to a distributed network which is capable of dynamically changing media resource request metafiles, as well as the responses to those media resource requests by media servers in the network, to provide more efficient content delivery in the network. More particularly, the present invention relates to a system and method capable of being employed in a distributed network for intercepting a media resource request metafile or a response to the media resource request by a media server in the network, and intelligently re-writing the response before sending the response to the media server or back to the requesting client, to thus improve content delivery in the network.

2. Description of the Related Art

In recent years, the Internet has become a widely used medium for communicating and distributing information. Currently, the Internet can be used to transmit multimedia data, such as streaming audio and video data, from content providers to end users, such as businesses, small or home offices, and individuals.

As the use of the Internet increases, the Internet is becoming more and more congested. Since the Internet is essentially a network of connected computers distributed throughout the world, the activity performed by each computer or server to transfer information from a particular source to a particular destination naturally increases in conjunction with increased Internet use. Each computer is generally referred to us as a "node" with the transfer of data from one computer or node to another being commonly referred to as a "hop." A user connecting to a Web site to read information is concerned with how quickly the page displays. Each Web page usually consists of 20–30 objects, and loading each object requires a separate request to the Web server. It can easily be determined how many visitors can access the content on a Web server at one time by examining the number of objects on a Web page. For example, if a Web page has 50 objects and a Pentium 233 network can handle approximately 250–300 URL connections a second, six people can access the server simultaneously and have the objects delivered in a timely manner. Once the entire page is delivered, there is no further interaction with the server until the user clicks on an object on the page. Until such action occurs, the server can process requests from other users.

Users expect a page to load quickly when they connect to a Web site, just as they expect the light to come on when they flip a switch, or a dial tone to sound when they pick up the phone, Internet users are increasingly expecting the page they request to load immediately. The more objects on the Web page, the longer it takes the contents of the page to load entirely. A page with 50 objects needs to connect with the server 50 times. Although the latency between connections is milliseconds, the latency can accumulate to a degree where it is unacceptable to a user.

A user connecting to a streaming media server, on the other hand, is concerned with the smoothness of the stream being viewed. Typically, only one connection is made for each video stream, but the connection to the server must be maintained for the duration of the stream. In a streaming media network, a persistent connection exists between the client and server. In this environment, a more important metric is the number of concurrent users (clients) that can connect to the server to watch a stream. Once the connection is made, a server plays the stream until it is completed or is terminated by a user.

Accordingly, in a streaming network, latency is not the dominant concern. Once the connection is established, streaming occurs in real time. A slight delay in establishing the connection is acceptable because the viewer will be watching the stream for a while. It is more important that there be a persistent connection. Also, once viewers incur the delay at the request time, they are watching the stream in a slightly delayed mode. The main concern while watching a stream is jitter and packet loss.

As can be appreciated from the above, due to the huge volume of data that each computer or node is transferring on a daily basis, it is becoming more and more necessary to minimize the amount of hops that are required to transfer data from a source to a particular destination or end user, thus minimizing the amount of computers or nodes needed for a data transfer. Hence, the need exists to distribute servers closer to the end users in terms of the amounts of hops required for the server to reach the end user.

In addition, media resource requests are performed in many ways by a client (e.g., an end user), such as inside of a real time streaming protocol (RTSP) connection or by a simple hyper text transfer protocol (HTTP) request. Metafiles are the typical response for a media request. However the response can also come inside of a binary file or the protocol being used between the client and server. In each of these cases, they are similar in that the response served by an Internet client-server application allows sending links to a resource rather than having to send the resource itself. These files and/or response information indicate to the client the location of requested media, i.e., where it should connect to and in what order. In video serving applications, metafiles allow content providers to create playlists of video clips, but metafiles can also be used to help define events and other information such as the author or resource owner. Further, many new options are being added into these metafiles which make their contents more of a scriptable language to handle conditions and other more dynamic needs.

Presently, metafiles are either statically or dynamically generated by a centralized web server. Further, once a metafile is sent to a client, there is no way to change the metafile after it leaves the origin server. Distributed networks currently need to write metafiles from a centralized location and thus understand where the client request is coming from in order to send it to a remote server for the requested resource.

Accordingly, a need exists for a distributed network such as those described above to be capable of dynamically changing media resource request metafiles, as well as the responses to those media resource requests by media servers in the network, to provide more efficient content delivery capability in the network.

SUMMARY OF THE INVENTION

An object of the present invention is to provide a distributed network which is capable of dynamically changing media resource request metafiles, as well as the responses to those media resource requests by media servers in the network, to provide more efficient content delivery in the network.

Another object of the present invention is to provide a system and method that can be implemented in a distributed network for intercepting a media resource request metafile or a response to the media resource request by a media server in the network, and intelligently re-writing the response before sending to the media server or back to the requesting client, to thus improve content delivery capability of the network.

These and other objects of the present invention are substantially achieved by providing a system and method for implementation in a distributed network, for intercepting a media resource request metafile client request, or a response to the media resource request by a media server in the network, and intelligently rewriting the response before sending it back to the requesting client. The file or protocol response can be rewritten according to localized information such as resource availability and client request information which the centralized web server may not have or even be able to obtain, such as the client's ISP, browser type, ISP's surfing trends, and so on. The system and method thus enables the network to send the local client to either a local server or a remote server to receive the requested content. The distributed network therefore need not have a centralized structure where everything about the network is known at one location. Instead, the central location can send back a response that it deems most appropriate, and other networks along the path of travel of the response can likewise intercept and change this request to "fine tune" the response for their respective network.

BRIEF DESCRIPTION OF THE DRAWINGS

These and other objects, advantages and novel features of the invention will be more readily appreciated from the following detail description when read in conjunction with the accompanying drawings, in which.

Throughout the drawing figures, like reference numerals will be understood to refer to like parts and components.

DETAILED DESCRIPTION OF THE PREFERRED EMBODIMENTS

Figure 1:
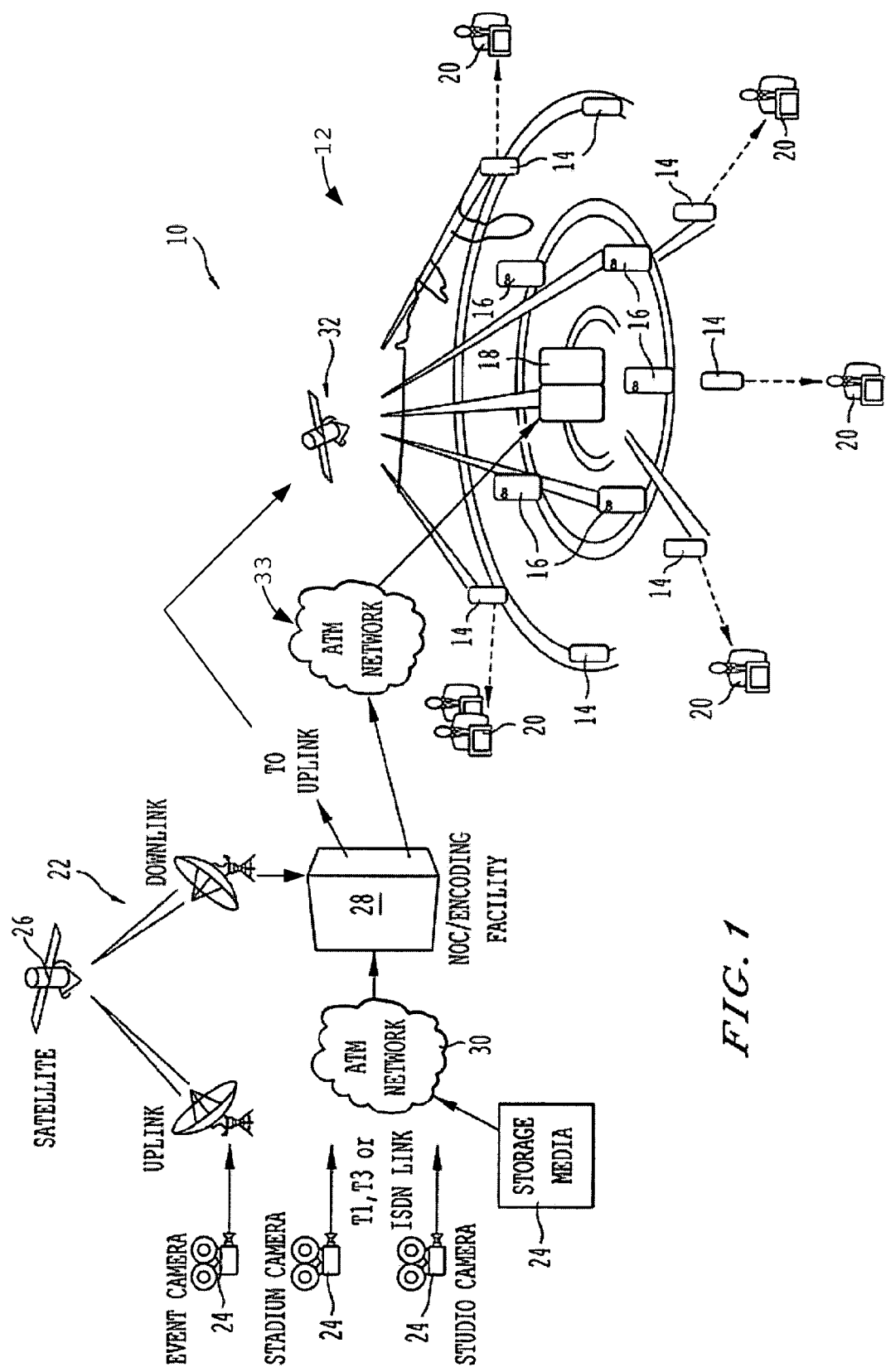
FIG. 1 is a conceptual block diagram illustrating an example of a network according to an embodiment of the present invention.

An example of a network 10 according to an embodiment of the present invention is shown in FIG. 1. As described in more detail below, the network 10 captures content, such as multimedia data, using, for example, a dedicated or private network. The network 10 then broadcasts the content by satellite, asynchronous transfer mode (ATM) network or any other suitable network, to servers located at the edge of the Internet, that is, where users 20 connect to the Internet such as at a local Internet service provider (ISP). The network 10 therefore bypasses the congestion and expense associated with the Internet backbone to deliver high-fidelity streams with high quality of service (QOS) and at low cost to servers located as close to end users 20 as possible.

To maximize performance, scalability and availability, the network 10 deploys the servers in a tiered hierarchy distribution network indicated generally at 12 that can be built from different numbers and combinations of network building components comprising media serving systems 14, regional data centers 16 and master data centers 18. The master data centers 18 are configured to support enormous numbers of requests for streaming media and thus, is the first layer of redundancy for handling requests by end users from the Internet in general. The regional data centers 16 are strategically disposed at major "backbone" points across the Internet, and service traffic from within one subnetwork on the Internet to use within the same subnetwork, thus preventing the content of the data from being subjected to problems and idiosyncrasies associated with private and public peering which can occur on the Internet as can be appreciated by one skilled in the art. The regional data centers 16 are also capable of serving high volumes of data streams. The media serving systems 14, which make up the third layer of the network 10, are disposed within the access providers' points of presence (POPs) which are generally less than two router hops away from the end user 20. These media serving systems 14 are generally not subject to any of the idiosyncrasies of the Internet, and thus can be scaled to meet the needs of the specific POP.

Although only one master data center 18 is illustrated, it is to be understood that the network 10 can employ multiple master data centers 18, or none at all, in which event the network 10 can simply employ regional data centers 16 and media serving systems 14 or only media serving systems 14. Furthermore, although the network 10 is shown as being a three-tier network comprising a first tier having one or more master data centers 18, a second tier having regional data centers 16, and a third tier having media serving systems 14, the network 10 can employ any number of tiers.

The network 10 also comprises an acquisition network 22 that is preferably a dedicated network for obtaining media or content for distribution from different sources. As discussed in more detail below, the acquisition network 22 can further operate as a network operations center (NOC) which manages the content to be distributed, as well as the resources for distributing the content. For example, as discussed in more detail below, content is preferably dynamically distributed across the network 12 in response to changing traffic patterns in accordance with an embodiment of the present invention.

An illustrative acquisition network 22 comprises content sources 24, such as content received from audio and/or video equipment employed at, for example, an event, for a live broadcast via satellite 26. Live or simulated live broadcasts can also be rendered via stadium or studio cameras 24, for example, and transmitted via a terrestrial network such as a T1, T3 or ISDN or other type of a dedicated network 30 that employs asynchronous transfer mode ATM technology. In addition to live analog or digital signals, the content can be provided from storage media 24 such as analog tape recordings, and digitally stored information (e.g., media-on-demand or MOD), among other types of content. Further, in addition to a dedicated link 30 or a satellite link 26, the content harvested by the acquisition network 22 can be received via the internet, other wireless communication links besides a satellite link, or even via shipment of storage media containing the content, among other methods.

As further shown, the content is provided via the satellite uplink and downlink, or by the ATM 30, to an encoding facility 28. The encoding facility 28 is capable of operating continuously and converts in excess of, for example, 40 megabits/second of raw content such as digital video into Internet-ready data in different formats such as the Microsoft Windows Media (MWM), RealNetworks G2, or Apple QuickTime (QT) formats, to name a few. The network 10 employs unique encoding methods to maximize fidelity of the audio and video signals that are delivered.

With continued reference to FIG. 1, the encoding facility 28 provides encoded data to the hierarchical distribution network 12 via a broadcast backbone which is preferably a point-to-multipoint distribution network such as a satellite link 32, an ATM 33 or a hybrid fiber-satellite transmission circuit, which would be, for example, a combination of satellite link 32 and ATM 33. The satellite link 32 is preferably dedicated and independent of a satellite link 26 employed for acquisition purposes. The satellite delivery of the data leverages the economy of scale realizable through known broadcast technology, and further, bypasses the slower and costlier terrestrial backbone of the Internet to provide the end user with consistent and faster Internet performance, which results in lower bandwidth costs, better quality of service, and offer new opportunities. The satellite downlink can also has the capability for handling Ku, S, and C bands, as well as DSS.

The package delivery software employed in the encoding facility 28 allows the data files to be distributed by multicast UDP/IP, TCP/IP, or both, as can be appreciated by one skilled in the art. Also, the package delivery software includes a queuing server as well as a retransmission server that cooperate to transmit the data and quickly recover any lost data packets. This recovery scheme results in smoother delivery of streaming audio, video and multimedia data to the Internet. The tiered network building components 14, 16 and 18 are each preferably equipped with satellite receivers to allow the network 10 to simultaneously deliver live streams to all server tiers 14, 16 and 18 and rapidly update on-demand content stored at any tier as described in more detail below. When a satellite link 32 is unavailable or impractical, however, the network 10 can broadcast live and on-demand content though fiber links provided in the hierarchical distribution network 12.

As discussed in more detail below, the network employs a director to monitor the status of all of the tiers 14, 16 and 18 of the distribution network 12 and redirect users 20 to the optimal server depending on the requested content. The director can originate, for example, from the NOC at the encoding facility 28. The network employs an internet protocol or IP address map to determine where a user 20 is located and then identifies which of the tiered servers 14, 16 and 18 can deliver the highest quality stream, depending on network performance, content location, central processing unit load for each network component, application status, among other factors.

Media serving systems 14 comprise hardware and software installed in ISP facilities at the edge of the Internet. The media serving systems 14 preferably only serve users 20 in its subnetwork. Thus, the media serving systems 14 are configured to provide the best media transmission quality possible because the end users 20 are local. A media serving system 14 is similar to an ISP caching server, except that the content served from the media serving network is controlled by the content provider that input the content into the network 10. The media serving systems 14 each serve live streams delivered by the satellite link 32, and store popular content such as current and/or geographically-specific news clips. Each media serving system 14 manages its storage space and deletes content that is less frequently accessed by users 20 in its subnetwork. Content that is not stored at the media serving system 14 can be served from regional data centers 16.

Figure 2:
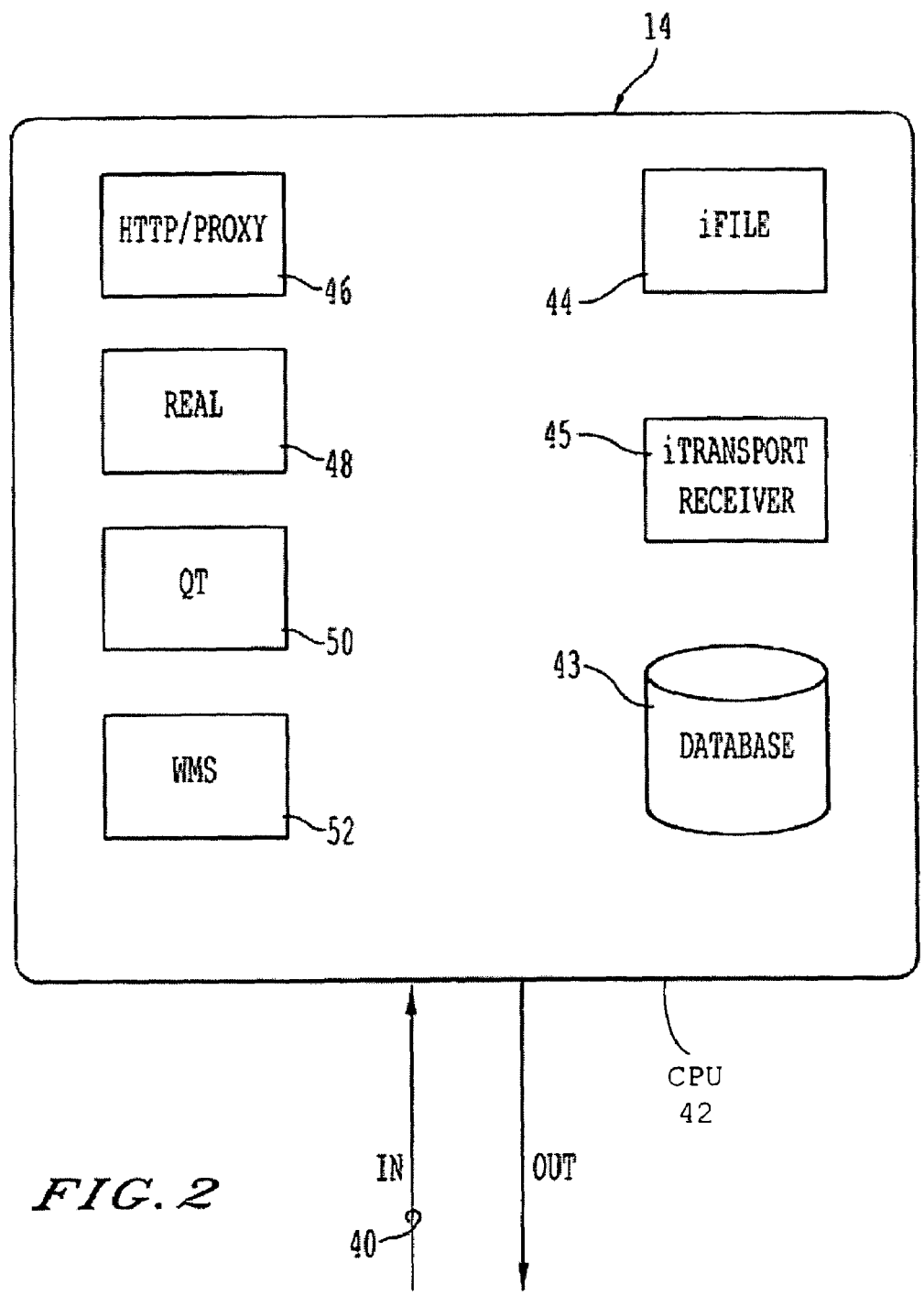
FIG. 2 is a conceptual block diagram of an example of a media serving system in accordance with an embodiment of the present invention.

Certain details and features of the media serving systems 14, regional data centers 16 and master data centers 18 will now be described. As shown in FIG. 2, a media serving system 14 comprises an input 40 from a satellite receiver and/or terrestrial signal receiver (not shown) which are configured to receive broadcast content from encoding facility 28 as described above with regard to FIG. 1. The media serving system 14 can output content to users 20 in its subnetwork, or can output control/feedback signals for transmission to the NOC in the encoding facility 28 or to another hierarchical component in the network 10 via wireline or wireless communication network. The media serving system 14 further includes a central processing unit 42 which controls operation of the media serving system 14, a local storage device 43 for storing content received at input 40, and a file transport module 44 and a transport receiver module 45 which operate to facilitate reception of content from the broadcast backbone. The media serving system 14 also preferably comprises one or more of an HTTP/Proxy server 46, a Real server 48, a QT server 50 and a WMS server 52 to provide content to users 20 in a selected format.

Figure 3:
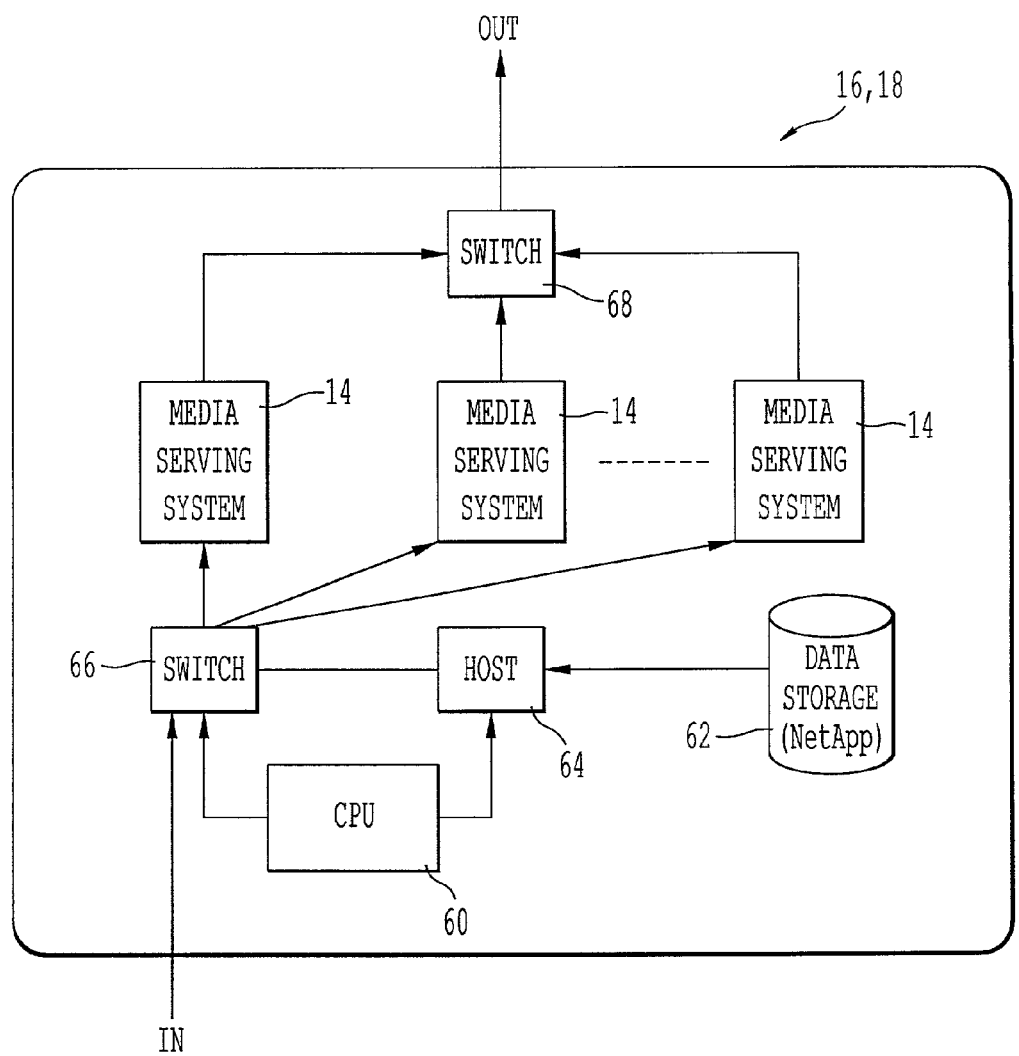
FIG. 3 is a conceptual block diagram of an example of data center in accordance with an embodiment of the present invention.
Figure 4:
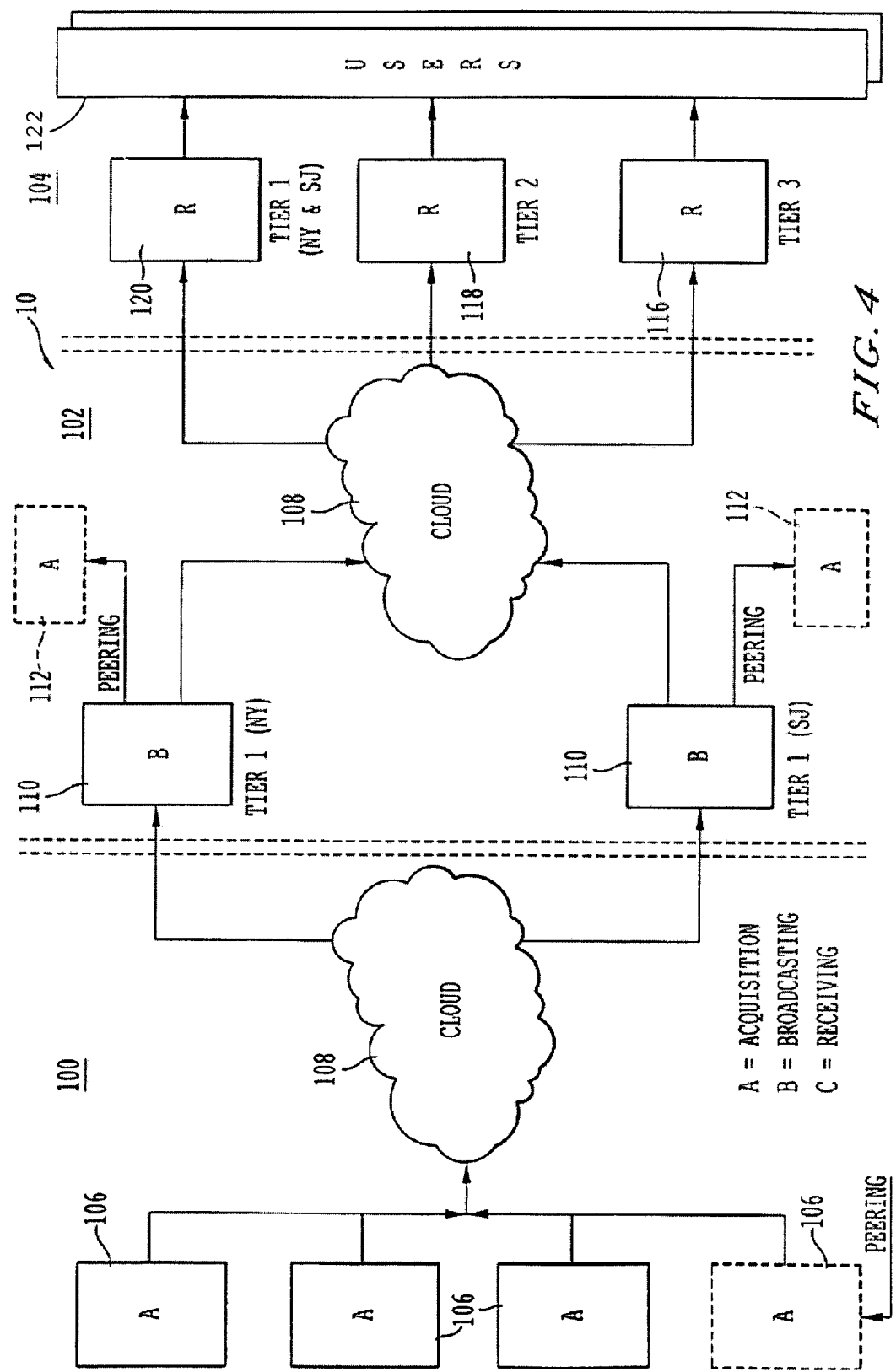
FIG. 4 is a diagram illustrating an example of data flow in the network shown in FIG. 1 in accordance with an embodiment of the present invention.
Figure 5A:
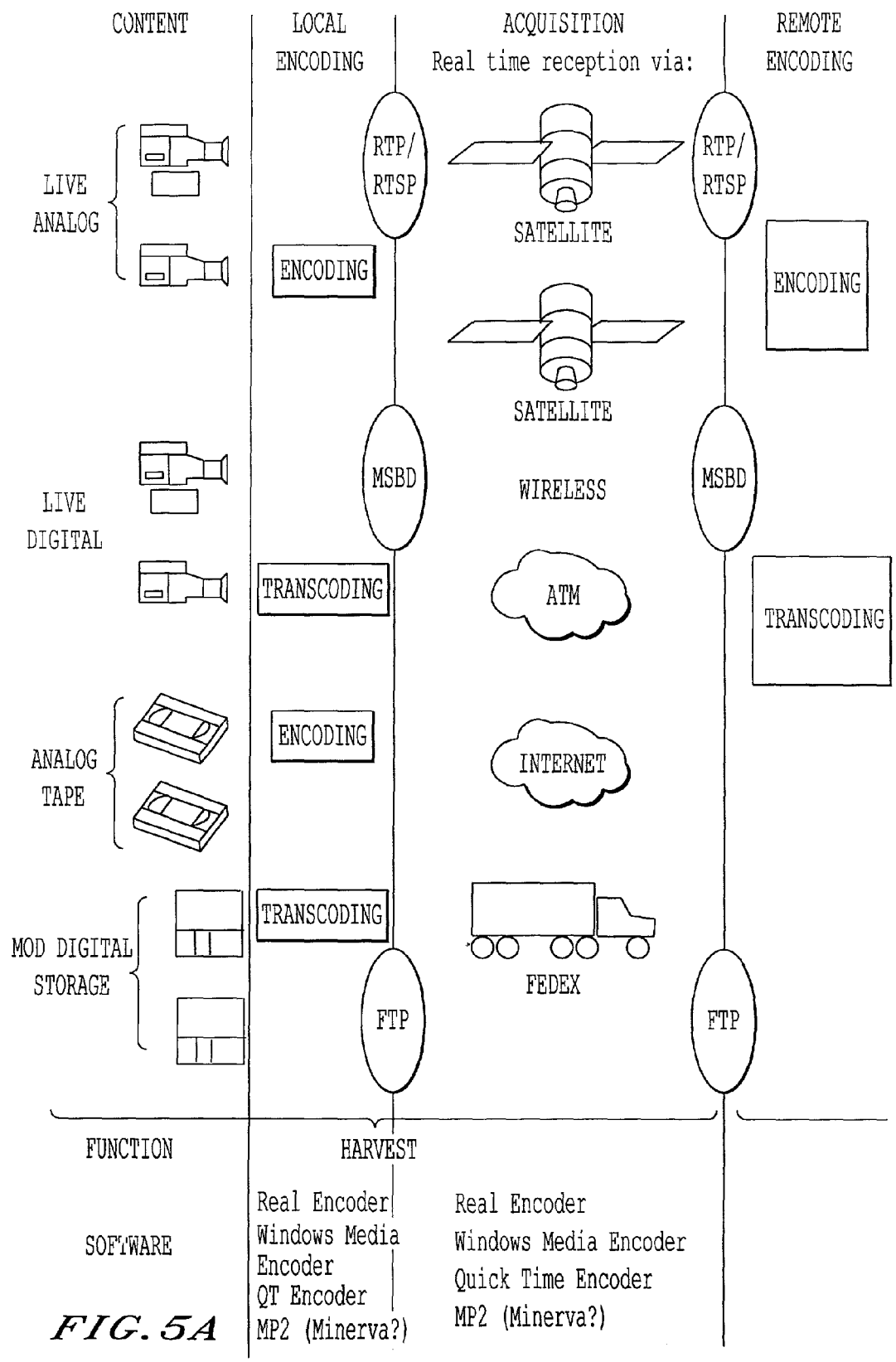
FIG. 5 is a diagram illustrating an example of content flow in the network shown in FIG. 1 in accordance with an embodiment of the present invention.
Figure 5B:
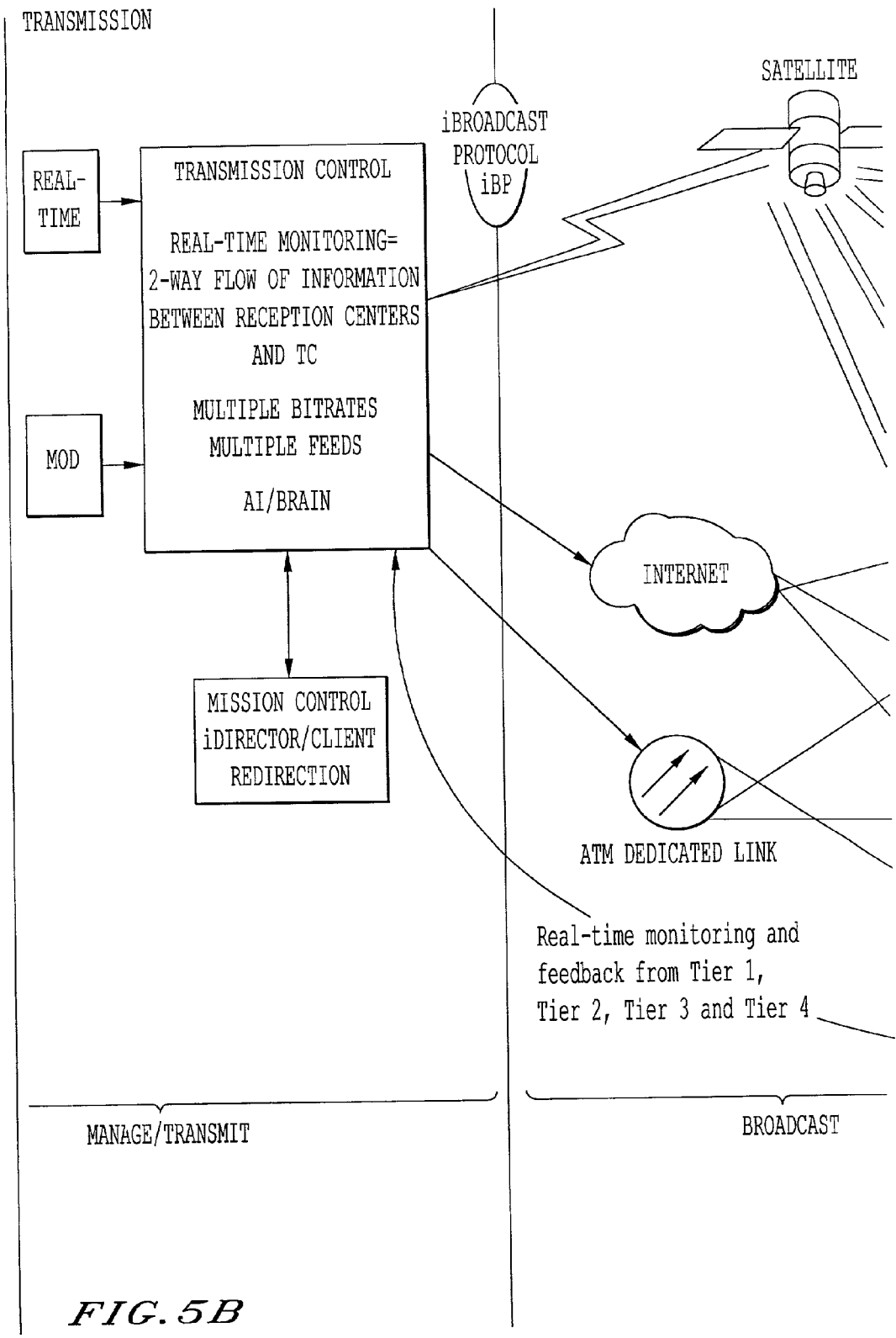
Figure 5C:
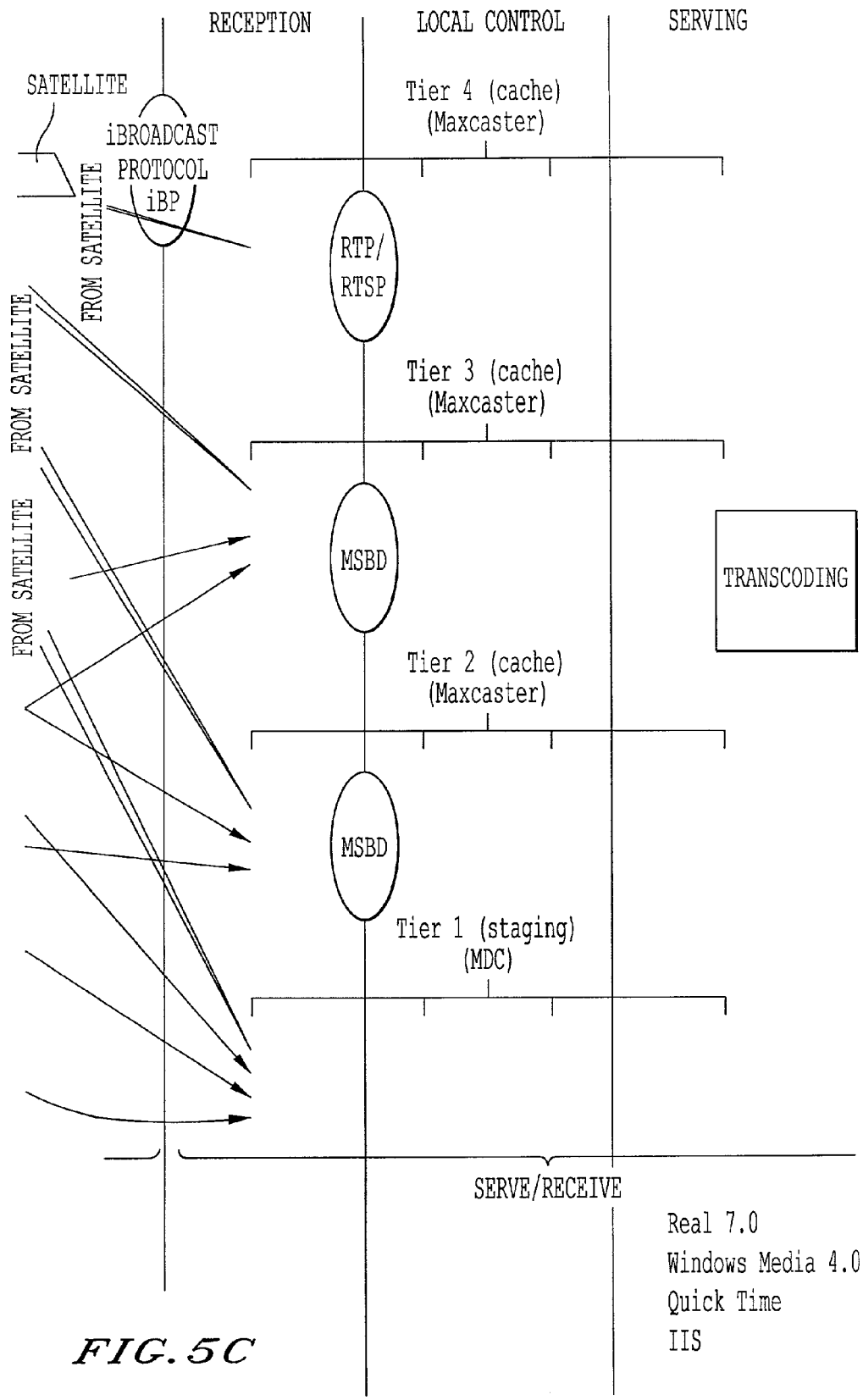
Figure 5D:
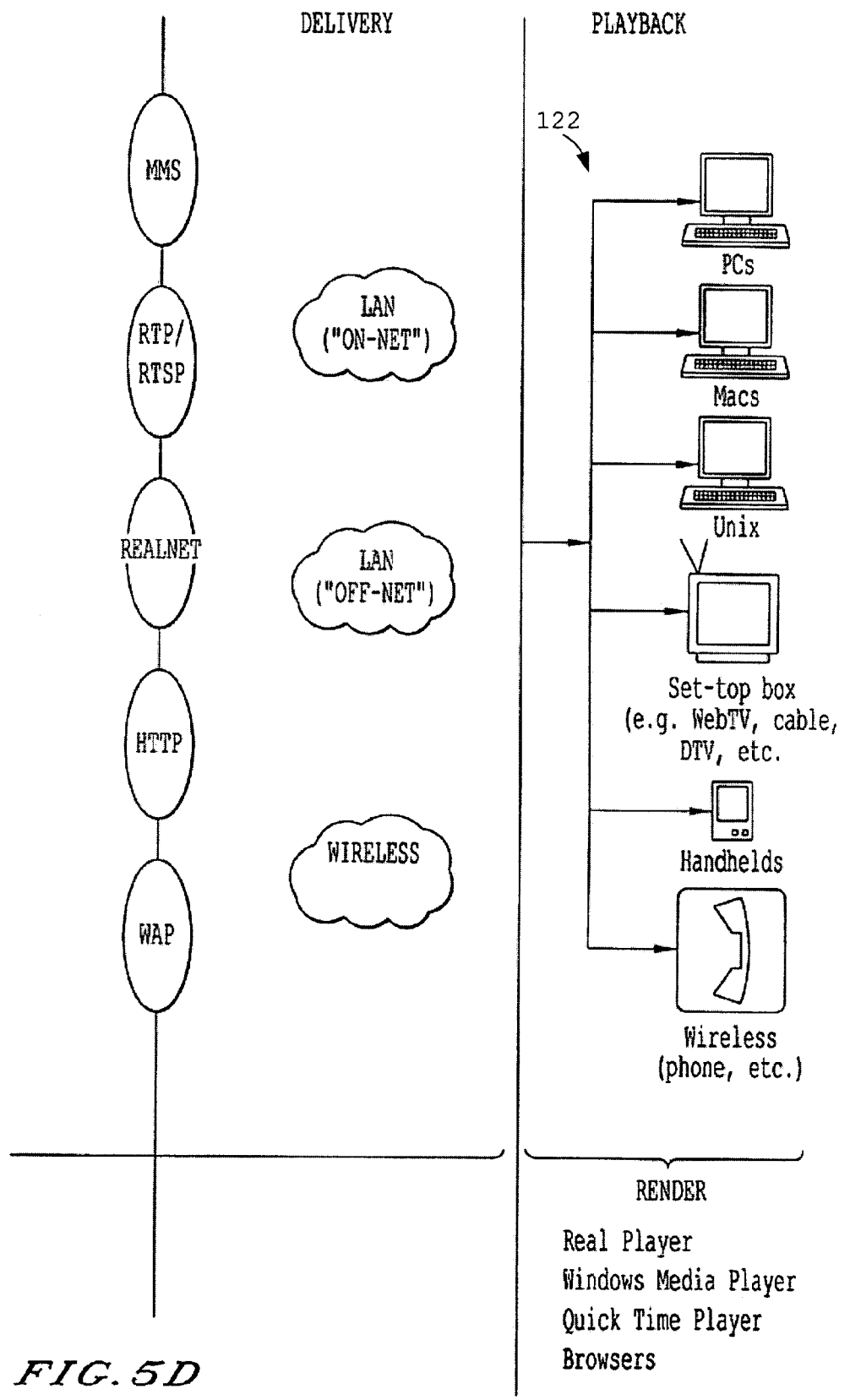

As shown in FIG. 3, a regional data center 16 comprises front-end equipment to receive an input from a satellite receiver and/or terrestrial signal receiver and to output content to users 20 of FIG. 1, or control/feedback signals for transmission to the NOC 28 of FIG. 1, or another hierarchical component in the network 10 of FIG. 1, via wireline or wireless communication network, such as 33 of FIG. 1. Specifically, a regional data center 16 preferably has more hardware than a media serving system 14 such as gigabit routers and load-balancing switches 66 and 68, along with high-capacity servers (e.g., plural media serving systems 14) and a storage device 62. The CPU 60 and host 64 are operable to facilitate storage and delivery of less frequently accessed on-demand content using the servers 14 and switches 66 and 68.

As discussed in more detail below, the regional data centers 16 also deliver content to a user 20 if a standalone media serving system 14 is not available to that particular user 20, or if that media serving system 14 does not include the content requested by the user 20. That is, the director at the encoding facility 28 preferably continuously monitors the status of the standalone media serving systems 14 and reroutes users 20 to the nearest regional data center 16 if the nearest media serving system 14 fails, reaches its fulfillment capacity or drops packets. Users 20 are typically assigned to the regional data center 16 of FIG. 1, that corresponds with the Internet backbone provider that servers their ISP, thereby maximizing performance of the second tier of the distribution network 12 of FIG. 1. The regional data center 16 of FIG. 1, also serve any users 20 of FIG. 1, whose ISP does not have edge server.

The master data centers 18 are similar to regional data centers 16, except that they are preferably much larger hardware deployments and are preferably located in a few peered data centers and co-location facilities, which provide the master data centers with connections to thousands of ISPs. Therefore, FIG. 3 is also used to illustrate an example of components included in a master data center 18. However, it is noted that a master data center 18 comprises multiterabyte storage networks (e.g., a larger number of media serving systems 14) to manage large libraries of content created, for example, by major media companies. As discussed in more detail below, the director at the encoding facility 28 automatically routes traffic to the closest master data center 18 if a media serving system 14 or regional data center 16 is unavailable to a user, or if the user has requested content that is not available at its designated media serving system 14 or regional data center 16. The master data centers 18 can therefore absorb massive surges in demand without impacting the basic operation and reliability of the network.

The flow of data and content will now be discussed with reference to FIGS. 4–8. As shown in FIGS. 4 and 5A–5D, the internet broadcast network 10 for streaming media generally comprises three phases, that is, acquisition 100 of FIG. 5A, broadcasting 102 of FIG. 5B, and receiving 104 of FIGS. 5C and 5D. In the acquisition phase 100, content is provided to the network from different sources such as internet content providers (ICPs) or event or studio content sources 24, as shown in FIG. 1. As stated previously, content can be received from audio and/or video equipment employed at a stadium for a live broadcast. The content can be, for example, live analog signals, live digital signals, analog tape recordings, digitally stored information (e.g., media-on-demand or MOD), among other types of content. The content can be locally encoded or transcoded at the source using, for example, file transport protocol (FTP), MSBD or real-time transport protocol!real-time streaming protocol (RTP/RTSP).

The content is collected using one or more acquisition modules 106 which are described in more detail below in connection with FIG. 6. The acquisition modules 106 represent different feeds to the network 10 in the acquisition network 22 shown in FIG. 1 and the components of the acquisition modules 106 can be co-located or distributed throughout the acquisition network 22. Generally, acquisition modules 106 can perform remote transcoding or encoding of content using FTP, MSBD, or RTP/RTSP or other protocols prior to transmission to a broadcast module 110 for multicast to edge devices and subsequent rendering to users 20 of FIG. 1. located relatively near to one of the edge devices. The content is then converted into a broadcast packet in accordance with an embodiment of the present invention. This process of packaging packets in a manner to facilitate multicasting, and to provide insight at reception sites as to what the packets are and what media they represent, constitutes a significant advantage of the network 10 over other content delivery networks.

Content obtained via the acquisition phase 100 is preferably provided to one or more broadcast modules 110 via a multicast cloud or network(s) 108. The content is unicast or preferably multicast from the different acquisition modules 106 to the broadcast modules 110 via the cloud 108. As stated above, the cloud 108 is preferably a point-to-multipoint broadcast backbone. The cloud 108 can be implemented as one or more of a wireless network such as a satellite network or a terrestrial or wireline network such as optical fiber link. The cloud 108 can employ a dedicated ATM link or the internet backbone, as well as a satellite link, to multicast streaming media. The broadcast modules 110 are preferably in the encoding center 28 that receive content from the acquisition modules 106 and, in turn, broadcast the content via satellite 32 of FIG. 1, ATM/Internet network 33 of FIG. 1, or both, to receivers at the media serving systems 14, regional data centers 16, and master data centers 18 (see FIG. 1) in tiers 116, 118 and 120, respectively (see FIG. 12).

During the broadcasting phase 102, broadcast modules 110 operate as gatekeepers, as described below in connection with FIG. 7, to transmit content to a number of receivers in the tiers 116, 118 and 120 via paths in the multicast cloud 108. The broadcast modules 110 support peering with other acquisition modules indicated generally at 112. The peering relationship between a broadcast module 110 and an acquisition module 112 can occur via a direct link, and each device agrees to forward the packets of the other device and to otherwise share content directly across this link, as opposed to across a standard Internet backbone.

During the reception phase 104, high-fidelity streams that have been transmitted via the broadcast modules 110 across the multicast cloud 108 are received by servers at the at the media serving systems 14, regional data centers 16, and master data centers 18 in tiers 116, 118 and 120, respectively, with the media serving systems 14 being as close to end users as possible. The network 10 is therefore advantageous in that streams can bypass congestion and expense associated with the Internet backbone. As stated previously, the media serving systems 14, regional data centers 16 and master data centers 18 that correspond to tiers 116, 118 and 120, respectively, provide serving functions (e.g., transcoding from RTP to MMS, RealNet, HTTP, WAP or other protocol), as well as delivery via a local area network (LAN), the internet, a wireless network or other network to user devices 20, identified collectively as users 122 in FIGS. 4 and 5 which include PCs, workstations, set-top boxes such as for cable, WebTV, DTV, and so on, telephony devices, and the like.

Figure 6:
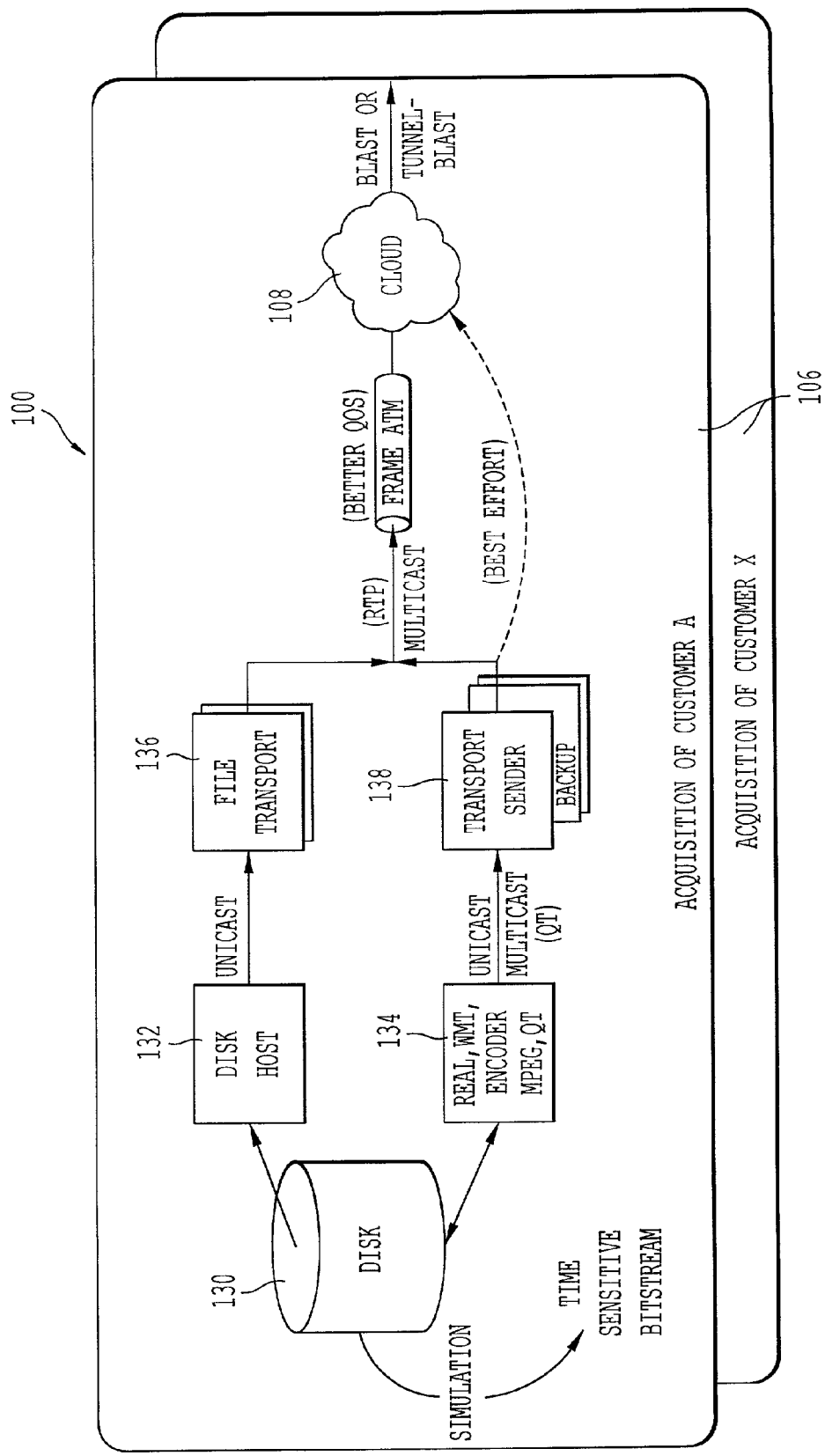
FIGS. 6, 7 and 8 illustrate acquisition, broadcasting and reception phases employed in the network shown in FIG. 1 in accordance with an embodiment of the present invention.
Figure 7:
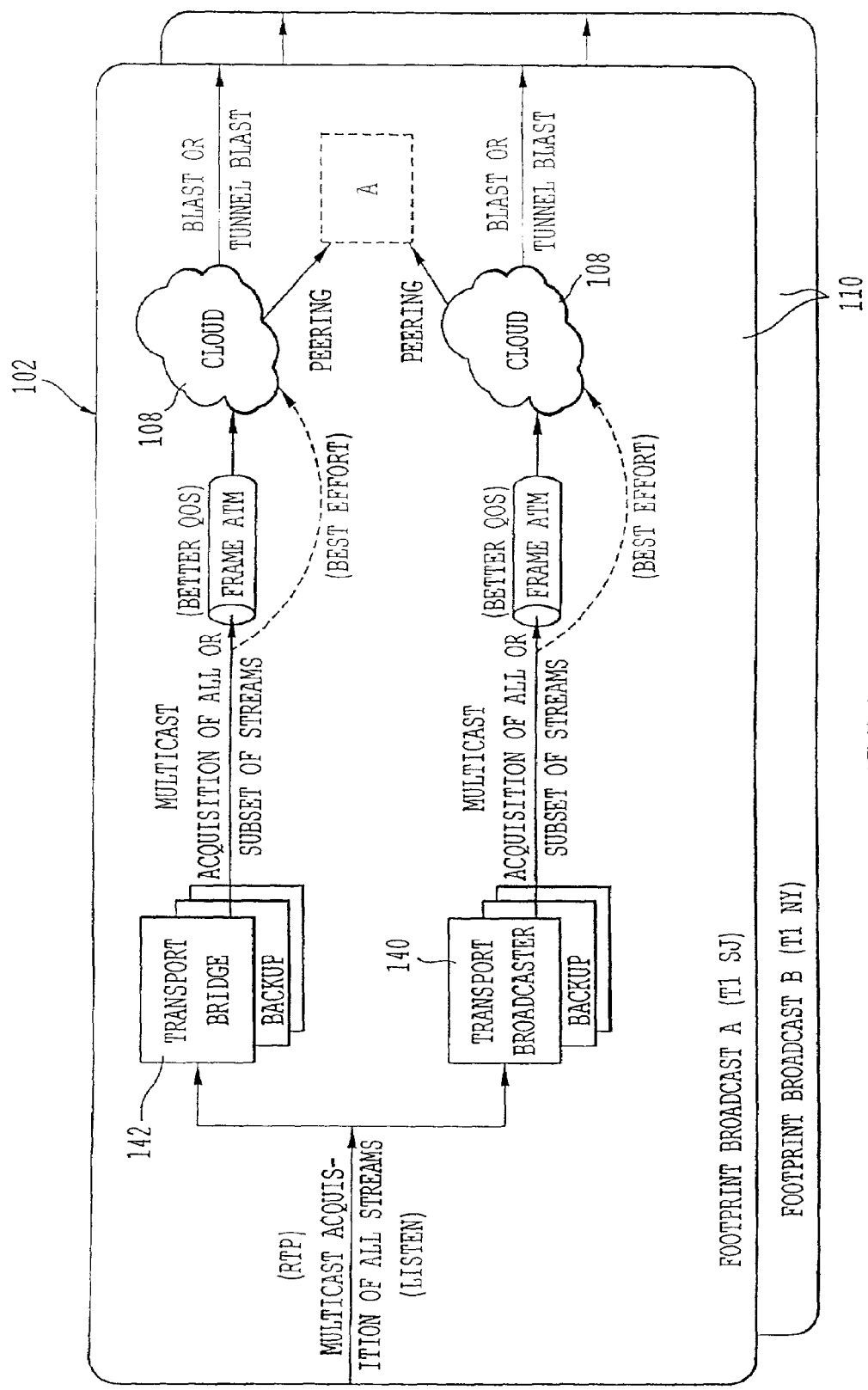
Figure 8:
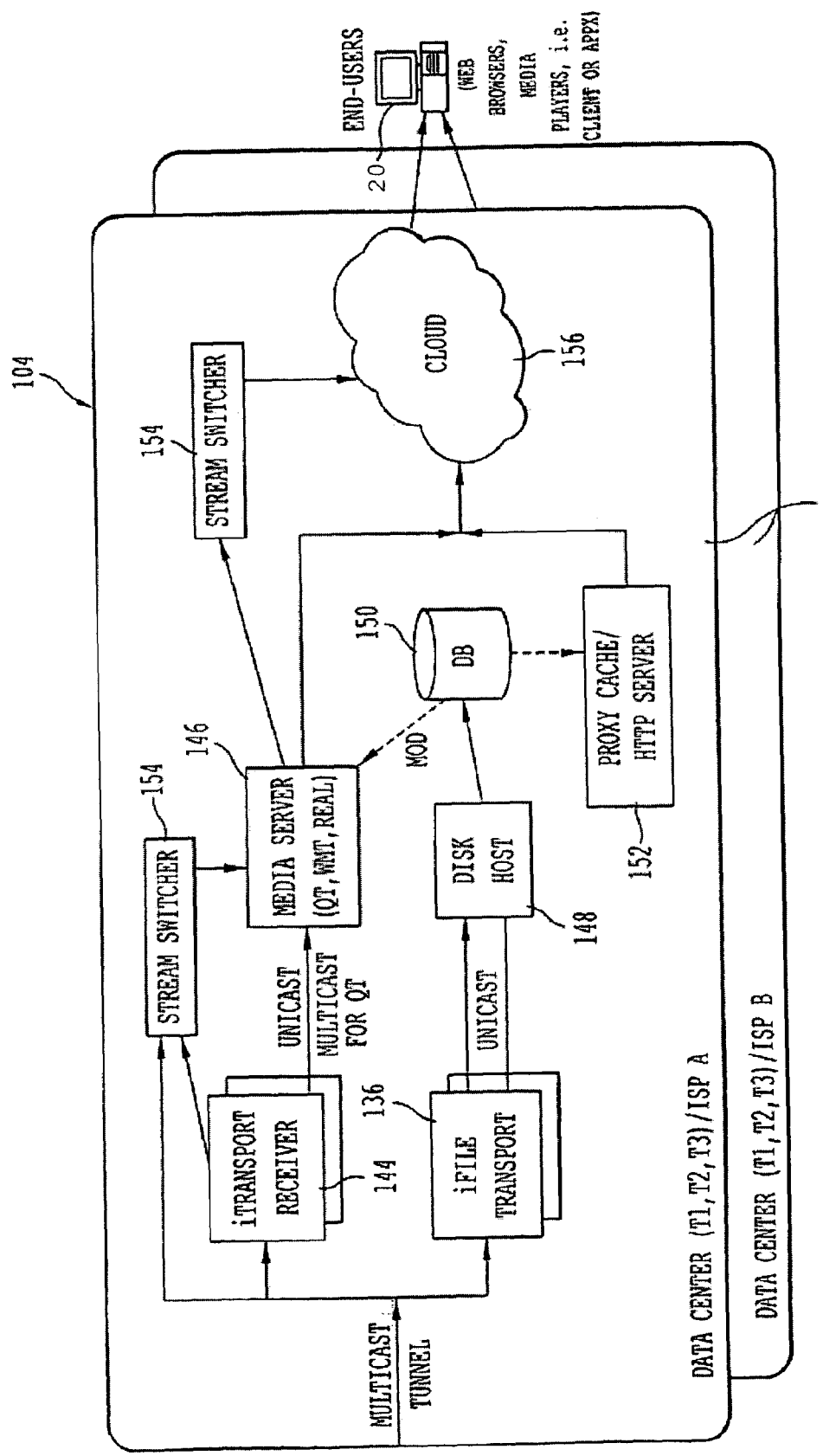

With reference to FIGS. 6–8, hardware and software components associated with the acquisition 100, broadcasting 102 and reception phases 104, as used in the network 10 of the present invention, will now be described in more detail. The components comprise various transport components for supporting media on demand (MOD) or live stream content distribution in one or multiple multicast-enabled networks in the network 10. The transport components can include, but are not limited to, a file transport module, a transport sender, a transport broadcaster, and a transport receiver. The content is preferably characterized as either live content and simulated/scheduled live content, or MOD (i.e., essentially any file). Streaming media such as live content or simulated/scheduled live content are managed and transported similarly, while MOD is handled differently as described in more detail below.

Acquisition for plural customers A through X is illustrated in FIG. 6. By way of an example, acquisition for customer A involves an encoder, as indicated at 134, which can employ Real, WMT, MPEG, QT, among other encoding schemes with content from a source 24. The encoder also encodes packets into a format to facilitate broadcasting in accordance with the present invention. A disk 130 stores content from different sources and provides MOD streams, for example, to a disk host 132. The disk host 132 can be proxying the content or hosting it. Live content, teleconferencing, stock and weather data generating systems, and the like, on the other hand, is also encoded. The disk host 132 unicasts the MOD streams to a file transport module 136, whereas the encoder 134 provides the live streams to a transport sender 138 via unicast or multicast. The encoder can employ either unicast or multicast if QT is used. Conversion from unicast to multicast is not always needed, but unicast-to-multicast conversion can be useful. The file transport module 136 transfers MOD content to a multicast-enabled network. The transport sender 138 pulls stream data from a media encoder 134 or an optional aggregator and sends stream announcements (e.g., using session announcement protocol and session description protocol (SAP/SDP)) and stream data to multicast internet protocol (IP) addresses and ports received from a transport manager, such as 170 of FIG. 9, which is described in more detail below with reference to FIG. 9. When a Real G2 server is used to push a stream, as opposed to a pulling scheme, an aggregator can be used to convert from a push scheme to a pull scheme. The components described in connection with FIG. 6 can be deployed at the encoding center 28 or in a distributed manner at, for example, content provider facilities.

FIG. 7 illustrates an exemplary footprint for one of a plurality of broadcasts. As shown in FIG. 7, the broadcasting phase 102 is implemented using a transport broadcaster 140 and a transport bridge 142. These two modules are preferably implemented as one software program, but different functions, at a master data center 18 or network operations center. The transport broadcaster 140 performs transport path management, whereas the transport bridge 142 provides for peering. The broadcaster 140 and bridge 142 get data from the multicast cloud (e.g., network 108) being guided by the transport manager and forward it to an appropriate transport path. One transport broadcaster 140, for example, can be used to represent one transport path such as satellite uplink or fiber between data centers or even a cross-continental link to a data center in Asia from a data center in North America. The broadcaster 140 and bridge 142 listen to stream announcements from transport senders 138 of FIG. 6. and enable and disable multicast traffic to another transport path, accordingly. They can also tunnel multicast traffic by using TCP to send stream information and data to another multicast-enabled network. Thus, broadcast modules 110 transmit corresponding subsets of the acquisition phase streams that are sent via the multicast cloud 108. In other words, the broadcast modules 110 operate as gatekeepers for their respective transport paths, that is, they pass any streams that need to be sent via their corresponding path and prevent passage of other streams.

As stated above, FIG. 8 illustrates an example the reception phase 104 at one of a plurality of servers or data centers. As stated above, the data centers are preferably deployed in a tiered hierarchy comprising media serving systems 14, regional data centers 16, and master data centers 18, each of FIG. 1. The tiers 116, 118 and 120, each of FIG. 12, comprise a transport receiver 144. Transport receivers can be grouped using, for example, the transport manager 170 of FIG. 9. Each transport receiver 144 receives those streams from the broadcast modules 110 that are being sent to a group to which the receiver belongs. The transport receiver listens to stream announcements, receives stream data from plural transport senders 138 of FIG. 6, and feeds the stream data to media servers 146. The transport receiver 144 can also switch streams, as indicated at 154 (e.g., to replace a live stream with a local MOD feed for advertisement insertion purposes). The MOD streams are received via the file transport 136 of FIG. 6, and stored, as indicated via the disk host 148, database 150 and proxy cache/HTTP server 152. The servers 146 and 152 can provide content streams to users 20.

The transport manager 170 will now be described with reference to FIG. 9 which illustrates an overview of transport data management. The transport manager is preferably a software module deployed at the encoding facility 28 or other facility designated as a NOC. Multiple content sources 24 (e.g., database content, programs and applications) provide content as input into the transport manager 170. Information regarding the content from these data sources is also provided to the transport manager such as identification of input content source 24 and output destination (e.g., groups of receivers). Decisions as to where content streams are to be sent and which groups of servers (e.g., tier 116, 118 or 120) are to receive the streams can be predefined and indicated to the transport manager 170 as a configuration file or XBM function call in real-time, for example, under control of the director as discussed in more detail below. This information can also be entered via a graphical user interface (GUI) 172 or command line utility. In any event, the information is stored in a local database 174. The database 174 also stores information for respective streams relating to defined maximum and minimum IP address and port ranges, bandwidth usage, groups or communities intended to receive the streams, network and streams names, as well as information for user authentication to protect against unauthorized use of streams or other distributed data.

The transport manager will now be described with reference to FIG. 9 which illustrates an overview of transport data management. The transport manager is preferably a software module deployed at the encoding facility 28 or other facility designated as a NOC. Multiple content sources 24 (e.g., database content, programs and applications) provide content as input into the transport manager 170. Information regarding the content from these data sources is also provided to the transport manager such as identification of input content source 24 and output destination (e.g., groups of receivers). Decisions as to where content streams are to be sent and which groups of servers (e.g., tiers 116, 118 or 120) are to receive the streams can be predefined and indicated to the transport manager 170 as a configuration file or XBM function call in real-time, for example, under control of the director as discussed in more detail below. This information can also be entered via a graphical user interface (GUI) 172 or command line utility. In any event, the information is stored in a local database 174. The database 174 also stores information for respective streams relating to defined maximum and minimum IP address and port ranges, bandwidth usage, groups or communities intended to receive the streams, network and stream names, as well as information for user authentication to protect against unauthorized use of streams or other distributed data.

Figure 9:
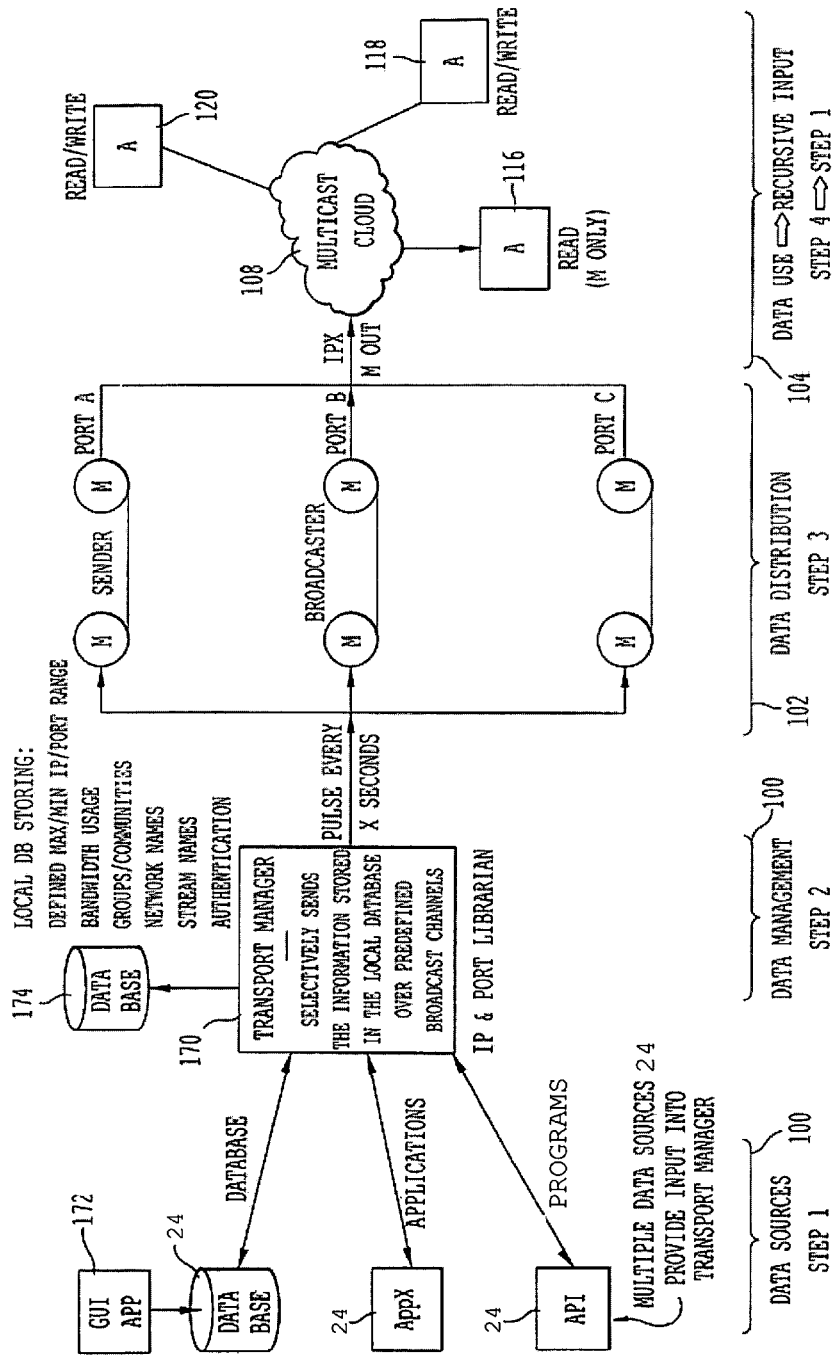
FIG. 9 illustrates an example of transport data management that occurs in the network shown in FIG. 1 in accordance with an embodiment of the present invention.

With continued reference to FIG. 9, a customer requests to stream content via the system 10 using, for example, the GUI 172. The request can include the customer's name and account information, the stream name to be published (i.e., distributed) and the IP address and port of the encoder or media server from which the stream can be pulled. Requests and responses are sent via the multicast network (e.g., cloud 108) using separate multicast addresses for each kind of transport component (e.g., a transport sender channel, a broadcaster channel, a transport manager channel and a transport receiver channel), or one multicast address and different ports. An operator at the NOC can approve the request if sufficient system resources are available such as bandwidth or media server capacity. The transport manager 170 preferably pulls stream requests periodically. In response to an approved request, the transport manager 170 generates a transport command in response to the request (e.g., an XML-based remote procedure call (XBM)) to the transport sender 138 of the acquisition module 106 (see FIG. 6) corresponding to that customer which provides the assigned multicast IP address and port that the transport sender is allowed to use in the system 10. The transport sender 138 receives the XBM call and responds by announcing the stream that is going to be sent, and all of the transport components listen to the announcement.

As discussed above, and in more detail below, once the transport sender 138 commences sending the stream into the assigned multicast IP address and port, the transport broadcaster 140 of the corresponding broadcast module 110 (see FIG. 7) will filter the stream. The transport receiver 144 of the appropriate tier or tiers 116, 118 or 120 (see FIG. 8) joins the multicast IP address and receives the data or stream if the stream is intended for a group to which the receiver 144 belongs. As stated above in connection with FIG. 8, the transport receiver 144 converts the steam received via the cloud 108 and sends it to the media server available to the users 20. The data is then provided to the media server associated with the receiver. Receivers 144 and broadcasters 140 track announcements that they have honored using link lists.

As stated above, the transport components preferably use RTP as a data transport protocol. Accordingly, Windows Media, RealG2 and QT packets are wrapped into RTP packets. The acquisition network 22 of FIG. 1, preferably employs an RTP stack to facilitate processing any data packets, wrapping the data packets with RTP header and sending the data packets. RTSP connection information is generally all that is needed to commence streaming.

RTP is used for transmitting real-time data such as audio and video, and particularly for time-sensitive data such as streaming media, whether transmission is unicast or multicast. RTP employs User Data gram Protocol (UDP), as opposed to Transmission Control Protocol (TCP) that is typically used for non-real-time data such as file transfer and e-mail. Unlike with TCP, software and hardware devices that create and carry UDP packets do not fragment and reassemble them before they have reached their intended destination, which is important in streaming applications. RTP adds header information that is separate from the payload (e.g., content to be distributed) that can be used by the receiver. The header information is merely interpreted as payload by routers that are not configured to use it.

RTSP is an application-level protocol for control over the delivery of data with real-time properties and provides an extensible framework to enable controlled, on-demand delivery of real-time data including live feeds and stored clips. RTSP can control multiple data delivery sessions, provide means for choosing delivery channels such as UDP, multicast UDP and TCP, and provide means for choosing delivery mechanisms based on RTP. HTTP is generally not suitable for streaming media because it is more of a store-and-forward protocol that is more suitable for web pages and other content that is read repeatedly. Unlike HTTP, RTSP is highly dynamic and provides persistent interactivity between the user device (hereinafter referred to as a client) and server that is beneficial for time-based media. Further, HTTP does not allow for multiple sessions between a client and server, and travels over only a single port. RTP can encapsulate HTTP data, and can be used to dynamically open multiple RTP sessions to deliver many different streams at the same time.

The system 10 employs transmission control software deployed at the encoding facilities 28, which can operate as a network operations center (NOC), and at broadcast modules 110 (e.g., at the encoding facility 28 or master data centers 18) to determine which streams will be available to which nodes in the distribution system 12 and to enable the distribution system 12 to support one-to-one streaming or one-to-many streaming, as controlled by the director. The extensible language capabilities of RTSP augment the transmission control software at the edge of the distribution network 12. Since RTSP is a bi-directional protocol, its use enables encoder modules 134 (see FIG. 6) and receiver modules 144 (see FIG. 8) to talk to each other, allowing for routing, conditional access (e.g., authentication) and bandwidth control in the distribution network 12. Standard RTSP proxies can be provided between any network components to allow them to communicate with each other. The proxy can therefore manage the RTSP traffic without necessarily understanding the actual content.

Typically, for every RTSP stream, there is an RTP stream. Further, RTP sessions support data packing with timestamps and sequence numbers. RTP packets are wrapped in a broadcast protocol. Applications in the receiving phase 104 can use this information to determine when to expect the next packet. Further, system operators can use this information to monitor network 12 and satellite 32 connections to determine the extent of latency, if any.

Encoders and data encapsulators written with RTP as the payload standard are advantageous because off-the-shelf encoders (e.g., MPEG2 encoders) can be introduced without changing the system 10. Further, encoders that output RTP/RTSP can connect to RTP/RTSP transmission servers. In addition, the use of specific encoder and receiver combinations can be eliminated when all of the media players support RTP/RTSP.

The manner in which streams and content are distributed throughout the tiers 116, 118 and 120 will now be further described with reference to FIGS. 10–12.

As discussed above, the master data centers 18 of FIG. 12 are configured to support enormous numbers of requests for streaming media and thus, is the first tier 120 of FIG. 12, of redundancy for handling requests by end users from the Internet in general. The regional data centers 16 of FIG. 12 make up the second tier 118 of FIG. 12, and are strategically disposed at major "backbone" points across the Internet. The regional data centers 16 service traffic from within one subnetwork on the Internet to use within the same subnetwork, thus preventing the content of the data from being subjected to problems and idiosyncrasies associated with private and public peering which can occur on the Internet as can be appreciated by one skilled in the art. The regional data centers 16 are also capable of serving high volumes of data streams. The media serving systems 14 of FIG. 12, which make up the third tier 116 of the network 12 of FIG. 12, are disposed within the access providers' points of presence (POPs) which are generally less than two router hops away from the end user. These media serving systems 14 are generally not subject to any of the idiosyncrasies of the Internet, and thus can be scaled to meet the needs of the specific POP.

The master data centers 18, in conjunction with the encoding facility 28 of FIG. 1, includes a director 200, which includes a distributed server application. The director 200 can poll information about the network 10 of FIG. 1, from a plurality of sources in the network 10 from other directors present at the regional data centers 16 and media serving systems 14, and can use this information to determine or modify the positions in the streaming data at which data received from content providers should be placed, so as to best distribute that data to the regional data centers 16 and media serving systems 14.

Figure 10:
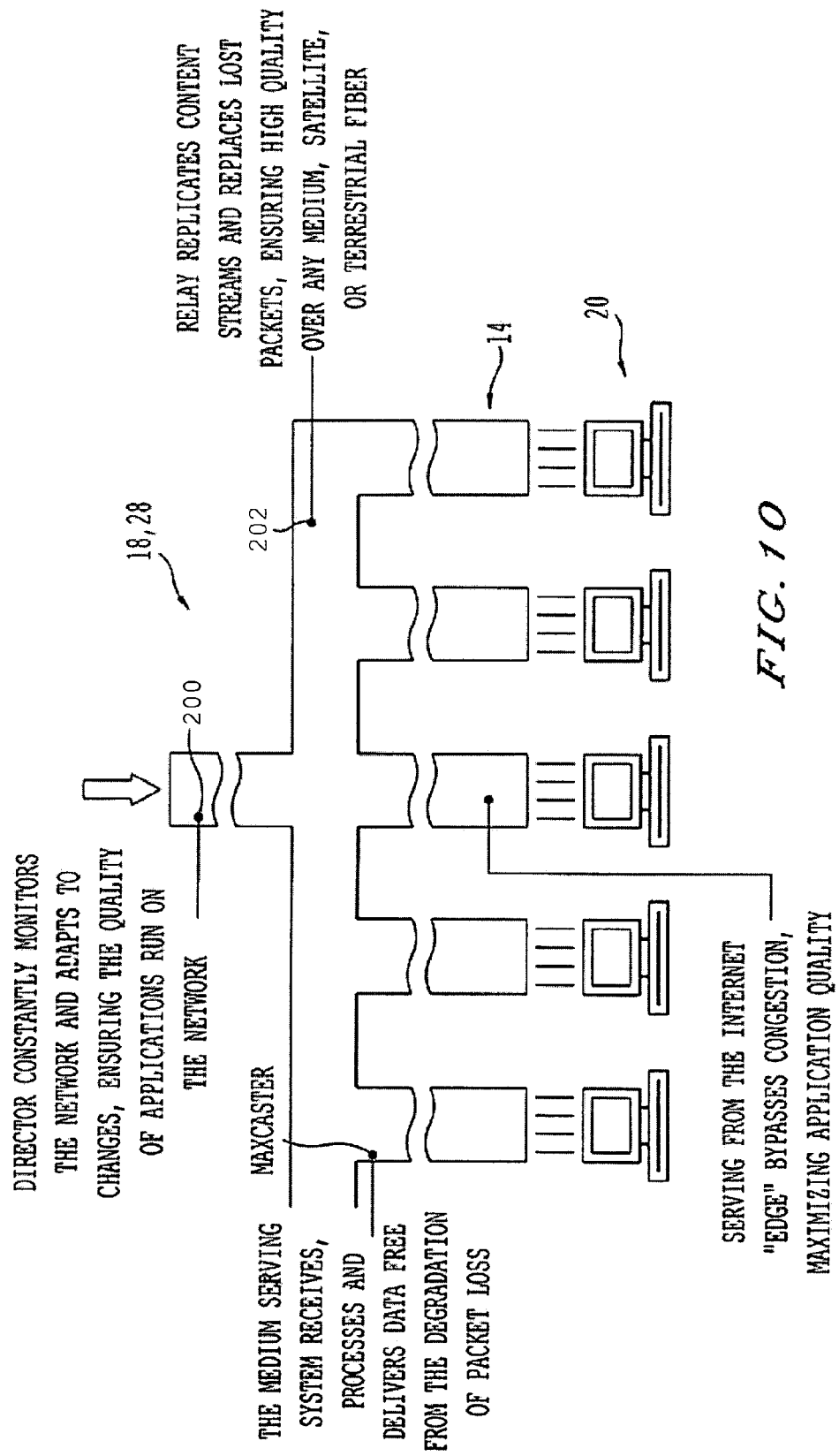
FIG. 10 illustrates an example of the distribution and operation of the director in the network shown in FIG. 1 in accordance with an embodiment of the present invention.

Referring to FIG. 1, under control of the director 200 of FIG. 10, the encoder 28 uplinks data received from content providers to the master data center or centers 18, the regional data servers 16 and the media serving systems 14 via satellite 32, ATM/Internet network 33, or both. The components of the network 10 cooperate as discussed above to insure that the correct multicast stream reaches every server in the network 10. Also, the satellite delivery of the data leverages the economy of scale realizable through known broadcast technology, and further, bypasses the slower and costlier terrestrial backbone of the Internet to provide the end user with consistent and faster Internet performance, which results in lower bandwidth costs, better quality of service, and offer new opportunities. The package delivery software employed at the encoding facility allows the data files to be distributed by multicast UDP/IP, TCP/IP, or both, as can be appreciated by one skilled in the art. Also, the package delivery software includes a queuing server as well as a retransmission server that cooperate to transmit the data and quickly recover any lost data packets. This recovery scheme results in smoother delivery of streaming audio, video and multimedia data to the Internet.

The encoding facility 28 distributes content to tiers 116, 118 and 120 to insure that the data from the content providers are efficiently and cost-effectively multicast out to all three tiers of the network 10 simultaneously. As shown in FIG. 10, the director constantly monitors the network and adapts to changes, ensuring the quality of applications run on the network 10. As further shown, relay software 202 is distributed throughout the network 10 to provide a reliable transport layer that makes sure no packets get lost across the broadcast backbone. The transport layer also lets applications scale connections from one-to-few to one-to-many. In addition to receiving and unpacking data from the broadcast backbone, the relay software 202 manages local storage and reports to the director 200 on the status of the remote server in its applications.

A distribution engine located at, for example, the encoding facility 28, operates periodically to analyze server logs generated and received from other tiers of the network 10, that is, from the regional data centers 16 and from the media serving systems 14, and determines which files to send based on cache engine rules, for example (i.e., the number of times a file was requested by users, file size, largest amount of storage at a remote site in the network 10, and so on). Based on this analysis, the broadcasting module 110 (see FIG. 7) performs serving and head-end functions, as well as streaming content directing functions, in order to transfer data to the regional data centers 16 and media serving systems 14

For example, when a particular multimedia data event (e.g., a video clip) is first provided via a content provider, that particular video clip will reside at the master data centers 18. Because presumably little or no statistics on the popularity of the video clip will be available initially, the analysis performed by the distribution engine will result in the distribution engine placing the video clip at a low priority position or, in other words, near the end of the data stream to be distributed. Because the servers at the regional data centers 16 and media serving systems 14 generally do not have sufficient data storage capacity to store all data in the data stream that they receive, these servers will most likely be unable to store and thus serve this video clip. That is, those servers generally will be able to store data at the beginning portion of the data stream, and will therefore disregard data more toward the end of the stream.

Accordingly, any request by a user for that video clip will be satisfied by a server at a master data center 18. Specifically, the director will provide a metatag file to the requesting user 20 which will enable the user 20 to link to the appropriate server at the master data center 18 from which the user 20 can receive the requested video clip.

However, as more and more users request the particular video clip, the statistics on this new data clip will become available, and can be analyzed by the distribution engine. As the popularity of the video clip increases, the distribution engine will place the video clip in a higher priority location in the video stream or, in other words, closer to the beginning of the video stream each time the video stream is transmitted to the regional data centers 16 and media serving systems 14. As stated above, the regional data centers 16 have memory sufficient to store subsets of the content available from the master data centers 18. Similarly, the media serving systems 14 also each have memory to store subsets of content that has been prioritized by the master data centers 18 to the extent of the memory capacity at the edge devices and ISP POPs.

The content at the devices in tiers 116 and 118 is dynamically replaced with higher prioritized content. Thus, as the video clip is moved closer to the beginning of the data stream, the likelihood that the video clip will be among the data that can be stored at the regional data centers 16 and media serving systems 14 increases. Eventually, if the video clip is among the most popular, it will be positioned by the distribution engine near the beginning of the data stream, and thus, become stored at all or most of the regional data centers 16 and media serving systems 14.

As discussed above, the director is an intelligent agent that monitors the status of all tiers 116, 118 and 120 of the network 10 and redirects users to the optimal server. The director uses an IP address map to determine where the end user 20 is located, and then identifies the server that can deliver the highest quality stream. The server choice is based on network performance and where the content is located, along with CPU load, application status, and other factors.

When an end user 20 requests a stream, the director determines the best server on the network 10 from which to deliver the streaming media data. Although at times the server that is physically closest to the end user can be the most appropriate choice, this is not always the case. For example, if a media serving system 14 local to an end user is being overburdened by a current demand for data, and an additional request is received from that end user within the same POP, that media serving system 14 would likely not be the best choice to provide the data request.

The director therefore runs a series of queries when determining from which server a particular data stream should be provided to a particular end user. Specifically, the director at the tier 120 (master data center) level will query directors at its "children" servers, which are the regional data centers 16. The directors at the regional data centers 16 will query directors at their "children" servers, which are their respective media serving systems 14. This queried information is provided by the directors at the media serving systems 14 to their respective regional data centers 16, which then provided that queried information along with their own queried information to the director at the master data centers 18. Based on this information, the director at the master data centers 18 can determine which server is best suited to satisfy the user request. Once that determination is made, the director at the master data centers 18 provides the appropriate metatag file to the user, to thus enable the user to link to the appropriate server represented by the metatag file (e.g., one of the media serving systems 14 that is close to the requesting user and available) so that the user can receive the requested video clip from that server.

As explained above, the director at the master data center 18 tier uses the queried data to determine stream availability or, in other words, whether a data stream exists within a particular POP or content hosting center associated with that server. The director determines the stream platform, such as whether the data stream is windows media or real G2. The director also determines stream bandwidth conditions, which indicate whether the data stream is a narrow bandwidth stream or a broad bandwidth stream. The director also inquires as to the performance of the server to assess whether the server and network are capable of serving that particular type of data stream. In addition, the director determines network availability by determining whether a particular master data center 18, regional data centers 16 or media serving system 14 is available from a network standpoint.

It is noted that not all type of servers on the network 10 will necessary carry all types of data streams. Certain classes of data content might only be served to end users from the master data centers 18 or regional data centers 16. Therefore, it is important that the director does not direct a data request to a server that does not support the particular data content requested by a user.

The platform for the data stream is also particularly important. From a real server licensing prospective, the network 10 needs to assure that data conformity is maintained.

This concern does not occur with a windows media platform. However, there are specific servers within in the master data centers 18 and regional data centers 16 that only serve windows media or real G2.

Stream bandwidth is also important to determine the best server to which to direct data requests. The director needs to assure that high bandwidth stream requests are directed to the highest performance locations on the network, and, in particular, the highest performance media serving systems 14 and regional data centers 16.

One problem with media servers is that the tools for determining current server performance are minimal, at best. Hence, in a distributed network such as network 10, it is crucial that the exact state of each server is known on a continued basis, so that the director can make the correct decisions if the server should receive additional requests. The director therefore has specific tools and utilities to assess the current state of any server as well as the number of current streams being served and the bandwidth of those streams. These tools report back current server state information that the director evaluates when determining the best server from which data should be provided in response to a particular user request.

Specifically, in accordance with an embodiment of the present invention, the director provides the network 10 with the ability to intercept a metafile or media resource client request, or a metafile or specific server protocol response, and intelligently re-write the response before sending it back to the requesting client (e.g., an end user 20). The file is rewritten according to localized information such as resource availability and client original information within the request that the centralized web server may not have or even be able to get (e.g., the client's ISP, browser type, ISP's surfing trends, etc.). This allows for many new networking solutions such as being able to send the local client to either a local server or a remote server, or the ability to identify the client at a centralized location by their ISP's name.

Figure 11:
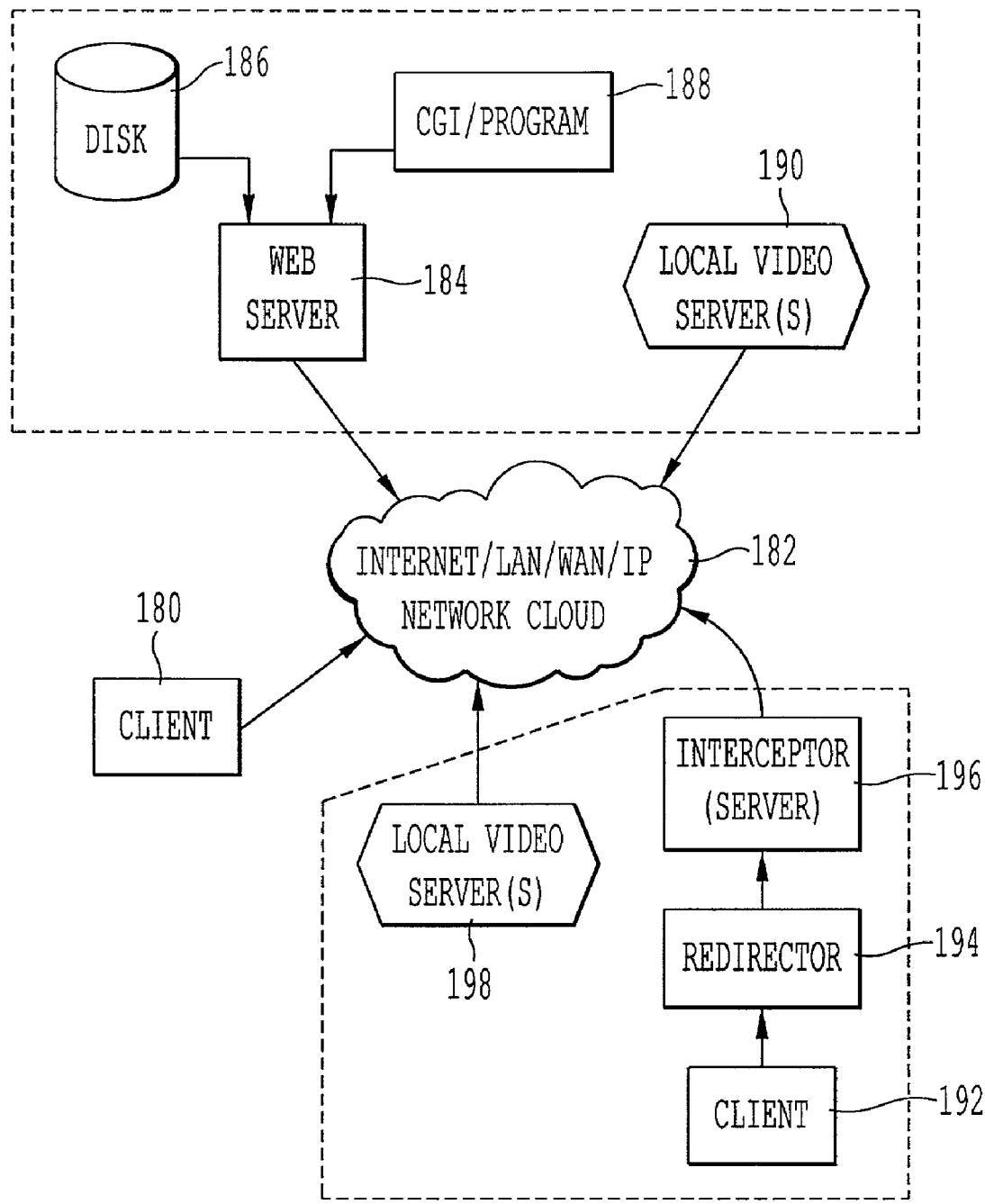
FIG. 11 is a conceptual block diagram illustrating exemplary components involved under control of the director for intercepting a media resource request metafile or a response to the media resource request by a media server in the network shown in FIG. 1, and intelligently re-writing the response before sending the response to the media server or back to the requesting client.
Figure 12:
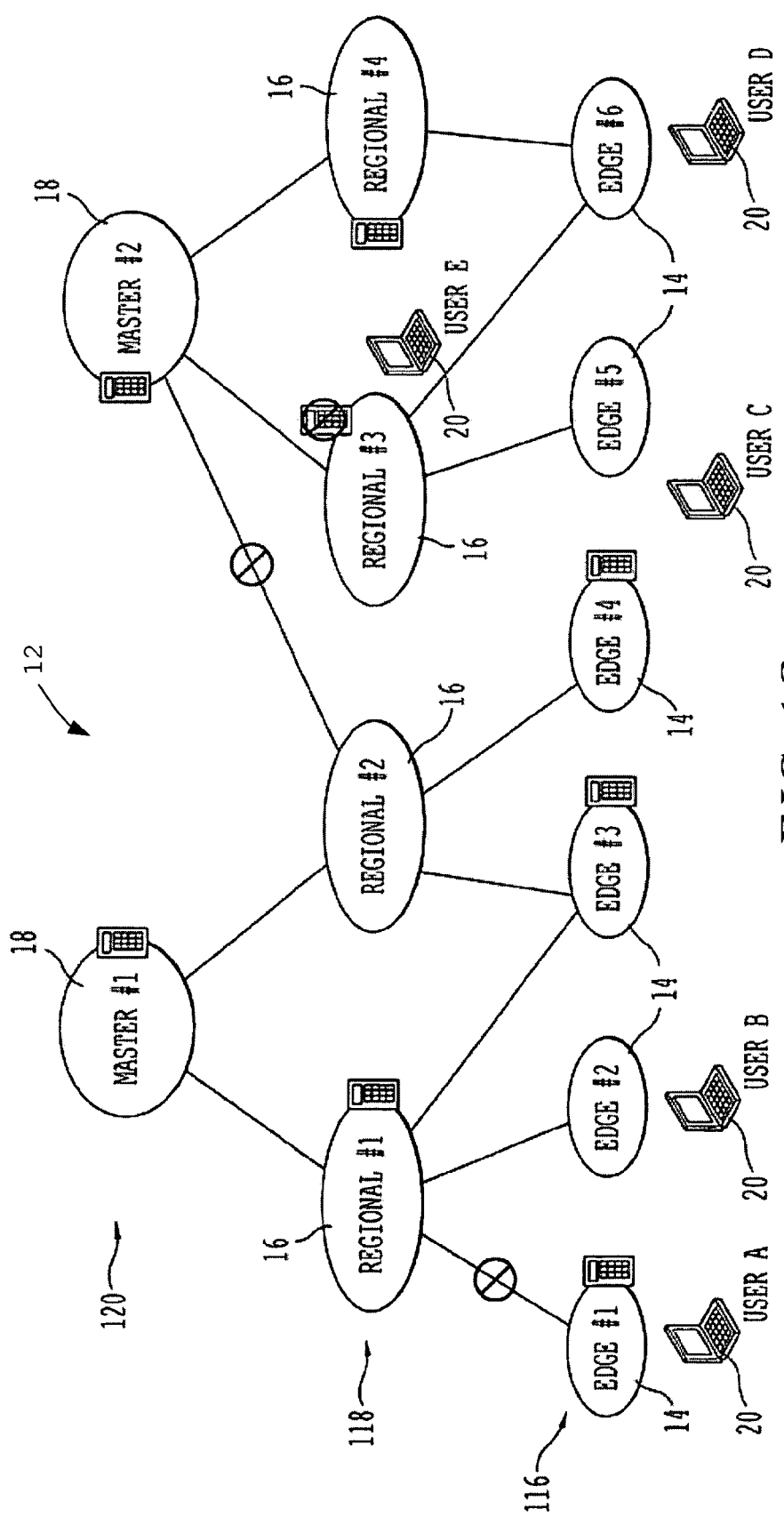
FIG. 12 is a conceptual diagram illustrating different media delivery scenarios performed by the network shown in FIG. 1 under different conditions.

FIG. 11 illustrates both the conventional utilization of metafiles in a network and the preferred embodiment of the present invention wherein the metafile is rewritten. When a client 180 (e.g., a user 20) requests a generic metafile/media resource, the request is transmitted through an Internet/LAN/WAN/IP network cloud 182 to a centralized web server 184 which is provided with either a statically generated metafile from a file storage disk 186 or a dynamically generated metafile from a CGI/program 188 indicating that requested media is located in a local video server(s) 190. In conventional systems, the metafile or specific protocol response is then transmitted to the client 180 so that the client may retrieve the media from the video server 190.

However, according to an embodiment of the present invention, when a client 192 requests a generic metafile/media, the request is received by a redirector 194 which, under control of the director as described above, redirects the request to an interceptor (server) 196. The interceptor requests the metafile or media resource from the centralized web or other media server 198 via the network cloud 182. The centralized web server 184 or other media server 198, receives either the statically generated metafile from the file storage disk 186 or the dynamically generated metafile from the CGI/program 188, and transmits the metafile or protocol response back to the client 192 via the network cloud 182. However, before the metafile or protocol response is delivered to the client 192, the redirector 194, under control of the director, analyzes the information contained in the metafile and changes it accordingly. For example, the metafile may be rewritten to change the links pointing to local server 190 to point to a different local server 198.

In addition, because most metafiles are delivered via TCP/unicast methods, the redirector 194 and interceptor 196 can be the same component. That is, the component that does the interception is also the one that then needs to be the responder to the initial client request. This can be required by the nature of a TCP session created between the client and the interceptor. There are also other ways recently to intercept a request, and at the point of interception, the interceptor can decide if a different type of response should be made, or if the request should simply be allowed to proceed to the intended destination. It is further noted that the interceptor 196 can be implemented in software and/or hardware in many ways. For example, the interceptor 196 can include a switch, a router, a proxy or other types of hardware or software components, the interceptor 196 can add information to the request if needed before sending it on to the server, or either respond directly or send a message to another application to respond instead. Accordingly, as can be appreciated from the above, the operations of the director, redirector 194 and interceptor 196 enable the request and the response to be rewritten according to localized data such as network topology local server availability Example of scenarios in which the director will determine from which server a data request should be handled for a particular user will now be described with reference to FIG. 12.

Full Decision Scenario #1

| | |
|---|---|
| User A (see FIG. 12) tries to requests a video stream | |
| Network Availability: | False |
| | Director will never see request since user has no connectivity to Internet and because link between Edge Server #1 and Regional #1 is down |
| Result: | User A will not be able to receive the stream even though there is a Media Server within its POP |

Full Decision Scenario #2

| | |
|---|---|
| User B (see FIG. 12) requests a 100 kb Real Video Stream | |
| Network Availability: | True |
| Server Availability: | Regional #1 and Master Data Center #1 |
| Stream Availability: | Stream exists in both locations |
| Stream Bandwidth: | Both sites can serve stream bandwidth |
| Server Performance: | Both available to serve stream |
| Result: | User directed to Real Server in Regional #1 |

Full Decision Scenario #3

| | |
|---|---|
| User C (see FIG. 12) requests a 300 kb Windows Media Stream | |
| Network Availability: | True to Edge #4, Master #1; False to Master #2 |
| Server Availability: | Edge #4 Master #1 |
| Stream Availability: | Stream exists on both Servers |
| Stream Bandwidth: | Edge #4 can serve stream bandwidth; Master #1 can't |

-continued

| | |
|---|---|
| Server Performance: | Edge #4 available to serve stream |
| Result: | User directed to Windows Media Server in Edge #4 |

Full Decision Scenario #4

| | |
|---|---|
| User D (see FIG. 12) requests 100 kb Windows Media Stream | |
| Network Availability: | True to Regional #3, Regional #4 and to Master #2 |
| Server Availability: | Regional #4 and Master #2 |
| Server Availability: | Stream exists on Master #2 |
| Stream Bandwidth: | Master #2 can serve stream bandwidth |
| Server Performance: | Master #2 available to serve stream |
| Result: | User directed to Windows Media Server in Master #2 |

Full Decision Scenario #5

| | |
|---|---|
| User E requests 100 kb Real G2 Stream | |
| Network Availability: | True to Regional #3, and to Master #2 |
| Server Availability: | Master #2 |
| Stream Availability: | Stream exists on server |
| Stream Bandwidth: | Master #2 can serve stream bandwidth |
| Server Performance: | Master #2 available to serve stream |
| Results: | User directed to Real Server in Master #2 |

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A system for handling data requests in a distributed data delivery network, the system comprising:
   a data resource request modifiers, adapted to intercept and modify a data resource request issued by a user requesting data from said network prior to said data resource request being advanced by a first data server encountered in said network, to create a modified data resource request; and
   a data delivery device, adapted to control routing of the requested data and delivery of the requested data from a data server in said distributed data delivery network to said user based on said modified data resource request, wherein said requested data remains unmodified through the delivery of the requested data from said data server to said user.

2. A system as claimed in claim 1, wherein:
   said data resource request includes a data resource request metafile;
   said data resource request modifier is adapted to modify said data resource request metafile to create a modified data resource request metafile included in said modified data resource request; and
   said data delivery device is adapted to control routing of said requested data from said data server based on said modified data resource request metafile.

3. A system as claimed in claim 1, wherein:
   said data delivery device issues a response to said user based on said modified data resource request to enable said user to receive said requested data from said data server.

4. A system as claimed in claim 1, wherein:
   said modified data resource request includes data identifying said data server as the data server from which said requested data is to be provided to said user.

5. A system as claimed in claim 4, wherein:
said data server identified by said data in said modified data resource request is different from a data server identified by data in said data resource request prior to modification.

6. A system for handling a response to a data request from a user requesting data from a distributed data delivery network, the system comprising:
a data response modifier, adapted to intercept and modify a data response issued by a data server in said network to create a modified data response before said requested data reaches said user, wherein said modified data response activates delivery of said requested data from an alternate server in the network, and in which said requested data remains unmodified from said alternate server through delivery to said user, and
a data delivery device, adapted to control routing of requested darn from the alternate data server in said distributed data delivery network to said user based on said modified data response.

7. A system as claimed in claim 6, wherein:
said data response includes a data response metafile;
said data response modifier is adapted to modify said data response metafile to create a modified data response metafile included in said modified data response; and
said data delivery device is adapted to control routing of said requested data from said data server based on said modified data response metafile.

8. A system as claimed in claim 6, wherein:
said data delivery device issues said modified data response to enable said user to receive said requested data from said alternate data server.

9. A system as claimed in claim 6, wherein:
said modified data response includes data identifying said alternate data server as the data server from which said requested data is to be provided to said user.

10. A system as claimed in claim 9, wherein:
said alternate data server identified by said data in said modified data response is different from a data server identified by data in said data response prior to modification.

11. A method for handling data requests in a distributed data delivery network, the method comprising:
intercepting and modifying a data resource request issued by a user requesting data from said network prior to said data resource request being advanced by a first data server encountered in said network, to create a modified data resource request; and
controlling routing of requested data from a data server in said distributed data delivery network to said user based on said modified data resource request, wherein said requested data remains unmodified through the delivery of the requested data from said data server to said user.

12. A method as claimed in claim 11, wherein:
said data resource request includes a data resource request metafile;
said data resource request modifying step includes modifying said data resource request metallic to create a modified data resource request metafile included in said modified data resource request; and
said controlling step includes controlling routing of said requested data from said data server based on said modified data resource request metafile.

13. A method as claimed in claim 11, further comprising:
issuing a response to said user based on said modified data resource request to enable said user to receive said requested data from said data server.

14. A method as claimed in claim 11, wherein:
said modified data resource request includes data identifying said data server as the data server from which said requested data is to be provided to said user.

15. A method as claimed in claim 14, wherein:
said data server identified by said data in said modified data resource request is different from a data sewer identified by data in said data resource request prior to modification.

16. A method for handling a response to a data request in a distributed data delivery network, the system comprising:
intercepting and modifying a data response issued by a data server in said network in response to a data resource request issued by a user requesting data from said network, before said response reaches said user, to create a modified data response, wherein said modified data response activates delivery of the data response from an alternate server in the network, and in which said requested data remains unmodified from said alternate serves through delivery to said user; and
controlling routing of requested data from said alternate data server in said distributed data delivery network to said user based on said modified data response.

17. A method as claimed in claim 16, wherein:
said data response includes a data response metafile;
said data response modifying step includes modifying said data response metafile to create a modified data response metafile included in said modified data response; and
said controlling step includes controlling routing of said requested data from said alternate data server based on said modified data response metafile.

18. A method as claimed in claim 16, further comprising:
issuing said modified data response to enable said user to receive said requested data from said alternate data server.

19. A method as claimed in claim 16, wherein:
said modified data response includes data identifying said alternate data server as the data server from which said requested data is to be provided to said user.

20. A method as claimed in claim 19, wherein:
said alternate data server identified by said data in said modified data response is different from a data server identified by data in said data response prior to modification.

* * * * *